United States Patent [19]

Yagi et al.

[11] Patent Number: 5,572,388
[45] Date of Patent: Nov. 5, 1996

[54] MAGNETIC DISK DRIVE

[75] Inventors: Norio Yagi, Kawasaki; Yoshihiro Arikawa, Higashine; Kaho Nishimura, Kawasaki, all of Japan

[73] Assignee: Fujitsu Limited, Kawasaki, Japan

[21] Appl. No.: 299,241

[22] Filed: Aug. 31, 1994

Related U.S. Application Data

[63] Continuation of Ser. No. 895,681, Jun. 8, 1992, abandoned.

[30] Foreign Application Priority Data

Jun. 10, 1991 [JP] Japan .................................. 3-137884
Jun. 11, 1991 [JP] Japan .................................. 3-138840

[51] Int. Cl.⁶ .................................................. G11B 5/55
[52] U.S. Cl. ................................................... 360/106
[58] Field of Search ............................... 360/106, 104

[56] References Cited

U.S. PATENT DOCUMENTS

| 4,797,762 | 1/1989 | Levy et al. ........................ 360/106 X |
| 4,991,045 | 2/1991 | Oberg ................................ 360/104 |
| 5,025,335 | 6/1991 | Stefansky ........................ 360/97.01 |
| 5,027,242 | 6/1991 | Nishida et al. .................... 360/106 |
| 5,041,932 | 8/1991 | Hamilton .......................... 360/104 |
| 5,099,374 | 3/1992 | Ohkita et al. ..................... 360/106 |
| 5,119,254 | 6/1992 | Brown et al. ..................... 360/106 |
| 5,202,804 | 4/1993 | Takekado ......................... 360/106 |

FOREIGN PATENT DOCUMENTS

| 60-182075 | 9/1985 | Japan . |
| 62-185287 | 8/1987 | Japan . |
| 2208815 | 8/1990 | Japan . |
| 2235272 | 9/1990 | Japan . |
| 312882 | 1/1991 | Japan . |
| 371417 | 3/1991 | Japan . |
| 380480 | 4/1991 | Japan . |
| 3144978 | 6/1991 | Japan . |
| 3178017 | 8/1991 | Japan . |

OTHER PUBLICATIONS

Disclosed anonymously, "Rotary Actuator Configuration for Magnetic Disk Files", *Research Disclosure*, Dec. 1989, No. 308.

Chapman, "Combination of Rotary and Linear Actuators", *IBM Technical Disclosure Bulletin*, Mar. 1984, vol. 26, No. 10B.

*Primary Examiner*—Richard E. Gluck
*Attorney, Agent, or Firm*—Greer, Burns & Crain, Ltd.

[57] ABSTRACT

A magnetic disk drive comprises a plurality of disks that have a laminated arrangement with equally fixed spaces respectively and are rotatably mounted a disk driving unit that forces the disks to rotate, a plurality of positioners mounted and movable in the direction of the tracks of the disks respectively, a positioner driving unit that drives the positioners so that their respective ends can traverse the tracks, and a plurality of reproducing/recording elements e.g., unitary magnetic heads that are fixed on the respective ends of the positioners and perform read/write operations for the surfaces of recording media of the disks, respectively. Each of the unitary magnetic heads is constructed such that each of said heads has a predetermined inclination to the respectively corresponding surface of recording media of the disks, preferably by forming a sloping surface on one end of each positioner.

Preferably, circuits for controlling the disk driving unit and the magnetic head, etc., of a disk drive are composed of a flexible printed circuit board to be contained in the disk enclosure having a base and cover.

41 Claims, 23 Drawing Sheets

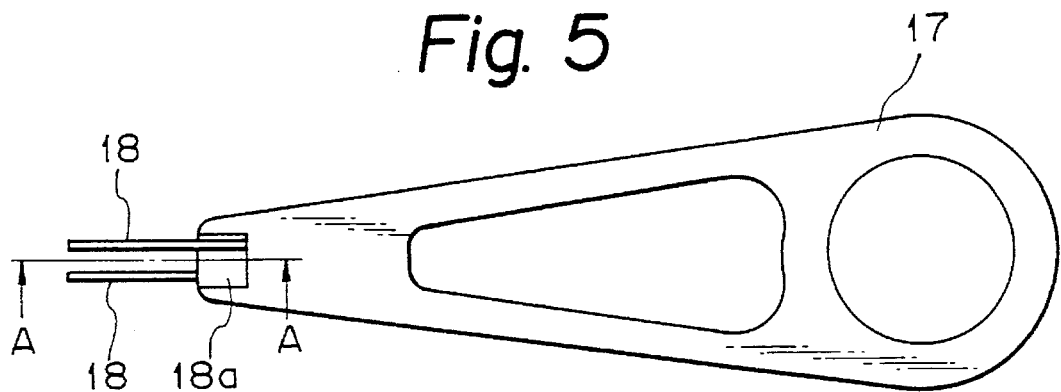
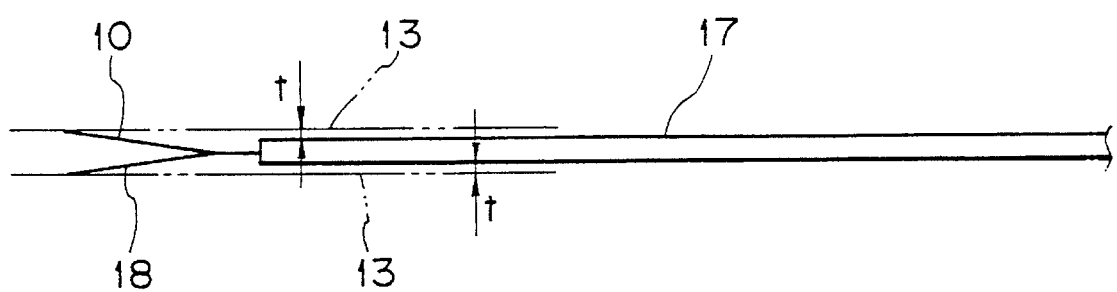
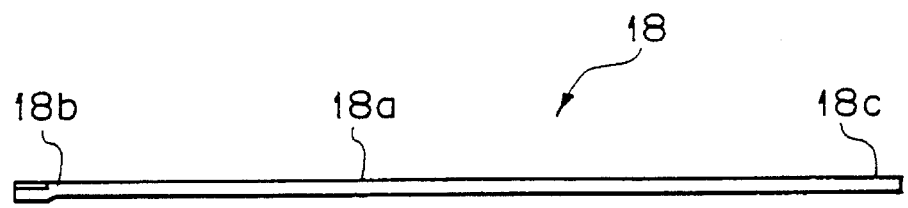

Fig. 39
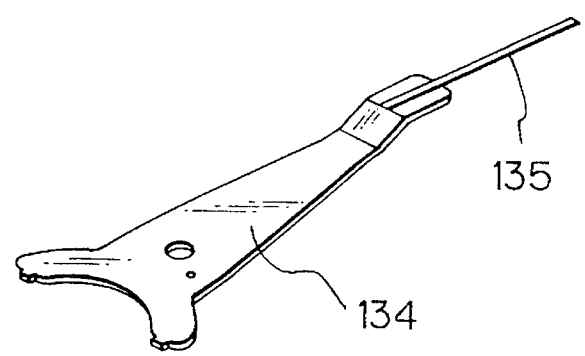
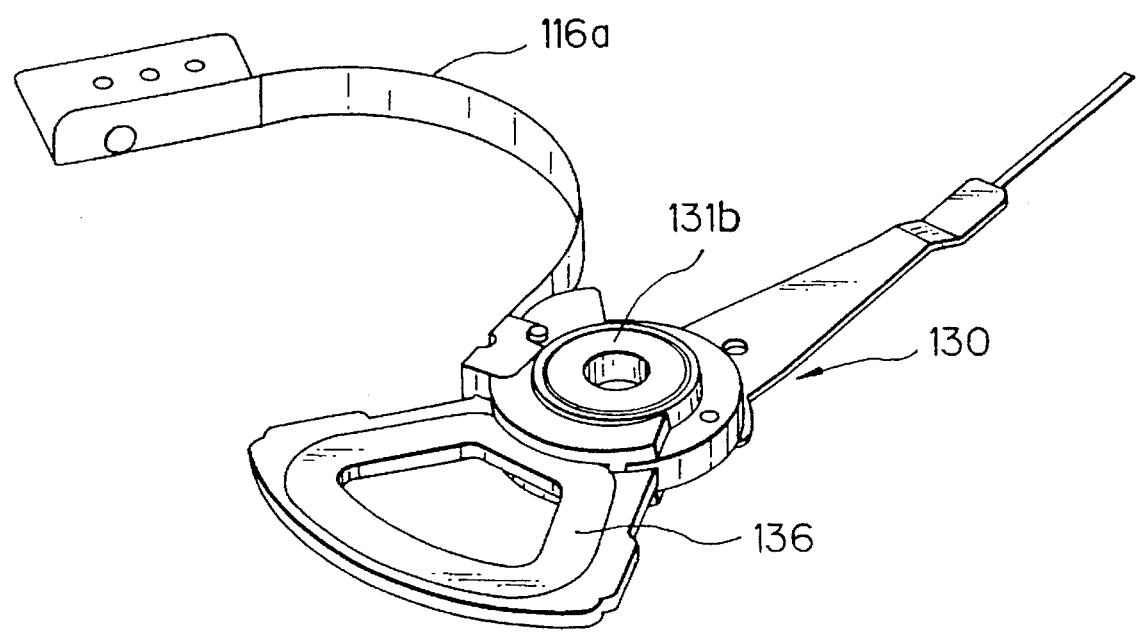

MAGNETIC DISK DRIVE

RELATED APPLICATION

This is a continuation of application Ser. No. 07/895,681, filed on Jun. 8, 1992 now abandoned.

BACKGROUND OF THE INVENTION

1. Field of the Invention

The present invention relates to a magnetic disk drive that can be utilized as an external memory of a computer. More specifically, it relates to an electromagnetic read/write structure of a magnetic disk drive including at least one magnetic disk, the corresponding magnetic head, and the like. Further, it relates to the arrangement of various components of a magnetic disk drive within a disk enclosure.

2. Description of the Related Art

Generally, a magnetic disk drive, having a number of magnetic disks utilized as recording media, has been in practical use in various regions including computer networks as one of the promising non-volatile memory devices. Furthermore, in recent years, the fabrication of a magnetic disk drive that satisfies the demand for a disk drive that is compatible, compact, inexpensive, has a large storage capacity, is light weight and has lower power consumption, has been required and has been in demand.

To meet the above requirements, it is necessary for as many magnetic disks as possible to be assembled in a confined space, rather than increasing the surface density of recording media of magnetic disks by improving the characteristics of the magnetic head, magnetic medium per se, etc., so that mass storage can be attained without increasing costs for the development of the improved magnetic head. Also, even when many disks are assembled in the space, it is necessary for the size of the disk drive to be reduced as small as possible, so that effective space can be saved thereby promoting compactibility. When the magnetic disk drive is applied to a mobile-type computer, such as a portable lap-top personal computer, it also becomes necessary for the disk drive to withstand external impulse and external electromagnetic disturbance, and be lighter in weight and have a lower power consumption.

In a known magnetic disk drive according to the prior art, typically, a number of disks are arranged rotatably at high speed in a laminated manner with equally divided spaces and on the respective surfaces of the magnetic layers, recording media are formed concentrically. Further, in the vicinity of these disks, positioners are mounted and movable in the direction of the tracks of the disks, respectively, and supporting members are attached to the above positioners, respectively. Further, on the respective ends of the above supporting members, the reproducing/recording elements, e.g., magnetic heads are fixed in close proximity to the respective surfaces of the disks, so that the former can perform read/write operations for the tracks of the disks.

To be more specific, each of the above supporting members have an arm that is fixed on each of the positioners. The base end portion of each suspension element is fastened to the tip portion of each arm with screws. The above suspension element is formed by a bending process of an extremely thin stainless steel sheet. Further, on both sides of the suspension element, bent portions are formed respectively to ensure the stiffness of the above suspension element. Each magnetic head is attached to the tip portion of each suspension element, via a gimbal.

In such a construction of a magnetic disk drive, in order to increase the maximum sheets of disks that can be assembled in a given place within a disk enclosure, it seems reasonable that the thickness of the arms of supporting members should be decreased so that the distance between the surfaces of adjoining disks become shorter. However, when the above distance is too short, the bent portions of adjoining suspension elements are likely to interface and come into contact with each other. Therefore, it is difficult for the distance between the surfaces of adjoining disks to be reduced below a fixed value. Furthermore, since the thickness of each magnetic head or any other portion of a supporting member other than the bent portion is also necessitated to some degree, it becomes more difficult for the distance between the surfaces of adjoining disks to be reduced to a value less than the limited value (for example, 3 mm). Consequently, when the dimensions of the disk drive are predetermined, a disadvantage occurs in that the sheets of disks cannot be increased much more than the limited value known in the prior art. On the contrary, when the number of sheets of disks assembled are predetermined, another disadvantage occurs in that the thickness of the disk drive cannot be reduced less than the limited value also known in the prior art.

Furthermore, in the conventional 5 inch, 3.5 inch or 2.5 inch magnetic disk drive, a printed board of various controlling circuits is usually positioned separately from the disk enclosure including the magnetic head, disks, etc. Typically, the above printed board is fixed on the bottom surface of the disk enclosure, i.e., outside the disk enclosure (for example, see U.S. Pat. No. 5,025,335 (Frederick M. Stefansky)). Therefore, taking into account the thickness of the printed board, the height of the whole disk drive becomes more significant (for example, approximately 15 mm). Consequently, because of the thickness of the printed circuit board, it is further difficult to promote compatibility in the disk drive.

Further, last year a 1.8 inch disk drive was introduced by Integral Pheripherals Inc. The construction of the above disk drive is similar to that of other disk drives and the height of the former disk drive is also approximately 15 mm as a whole. Integral Pheripherals Inc. is further emphasizing that a thinner disk drive, as thin as 10 mm, can be realized by locating a printed circuit board on the side of a disk enclosure. In this case, though the thickness of the disk drive can be reduced, a new problem occurs in that the area of the disk drive including the printed circuit board and the disk enclosure is enlarged more than usual.

SUMMARY OF THE INVENTION

Accordingly, an object of the present invention is to provide a disk drive having a magnetic head supporting structure that enables the distance between the surfaces of adjoining disks (the thickness of space between the disks) to be reduced as small as possible, to realize simultaneously, smaller dimensions, compactibity, higher storage density, larger storage capacity, lower cost, higher performance and the like.

A further object of the present invention is to provide a disk drive having a whole structure that enables a printed circuit board to be contained in a disk enclosure, to realize smaller dimensions both in thickness and area.

A still further object of the present invention is to provide a disk drive having a whole structure that is lighter in weight and higher in rigidity.

An additional object of the present invention is to provide a disk drive having plural magnetic heads and a supporting structure thereof, in which read/write operations can be performed at a higher speed and with smaller dimensions (e.g., less than 2.5 inch).

To attain the above objects, the disk drive according to the present invention has the following components: one or more disks that have a laminated arrangement with equally fixed spaces respectively and are mounted rotatably, a disk driving means that forces said disks to rotate, one or more positioners mounted and movable in the normal direction of the tracks of the disks, respectively, a positioner driving means that drives the positioners so that their respective ends can traverse the tracks, and one or more reproducing/recording elements that are fixed on the respective ends of the positioners and perform read/write operations for the surfaces of recording media of the disks, respectively. Further, each of the reproducing/recording elements is constructed such that each has a predetermined inclination to the respectively corresponding surface of recording media of the disks.

Preferably, each of the above reproducing/recording elements is a unitary magnetic head consisting of a flexible thin sheet body, a head portion that is located on one tip portion of the body and has an air gap for reproducing or recording on one surface of the body, and a mounting portion formed on the opposite tip portion of the body. Further, in this case, on each of the ends of the positioners is formed a sloping surface that has a given inclination to the respectively corresponding surface of recording media of the disks, and wherein said mounting portion is constructed to be fixed on the corresponding sloping surface.

Further preferably, on the upper side and lower side of one end of each positioner, sloping surfaces are formed respectively, and the mounting portions of a pair of unitary magnetic heads are fixed on the upper and lower side of one end of each positioner, respectively.

Further preferably, one end of each of the positioners is divided into two branches, and the first and second sloping surface portions are formed on a respective end position of the branches, on which the first unitary magnetic head unit and second unitary magnetic head unit are fixed respectively, so that the first and second unitary magnetic head units can perform read/write operations for the internal peripheral part and the external peripheral part of the tracks of each disk, respectively.

In such a construction, a read/write operation at each disk can be performed simultaneously by means of a plurality of unitary magnetic heads, and therefore the read/write operation can be executed at a higher speed, which leads to the shortening of access time necessary for the completion of a sequence of read/write operations.

Further, in a preferred embodiment, the above first and second unitary magnetic head units further comprise pairs of unitary magnetic head portions, respectively. Namely, four unitary magnetic heads are arranged in each of the positioners.

Further preferably, in each of the positioners is fixed or more one arms that extend toward the corresponding surface of a recording medium of each of the disks, and each of the unitary magnetic heads is arranged on one tip portion of the arm, supporting the unitary magnetic head.

Further, in another preferred embodiment, at least one arm portion functioning as the above arms is integrated with each of the positioners as a portion thereof.

Further, in another preferred embodiment, a disk drive according to the present invention includes the following components: one or more disks, a disk driving means that forces the disks to rotate, one or more reproducing/recording elements that perform read/write operations for the surface of a recording medium of the disk, one or more arms that support the reproducing/recording elements, one or more positioners that support the arm rotatably, one or more bearings that are arranged to allow the positioner to rotate, a positioner driving means that forces the positioner to rotate and make the reproducing/recording means move to a predetermined position on the surface of a recording medium of the disk, and a base and cover that constitute a disk enclosure in combination with each other. In this case, the above disk enclosure protects the main part of the above-mentioned various components.

Further, in another preferred embodiment, a disk drive according to the present invention includes the following components: two disks having a diameter of less than 1.8 inch, a disk driving means that forces the disks to rotate, four magnetic heads that perform read/write operations for the surfaces of recording media of the disks, arms that support the magnetic heads, positioners that support the arms rotatably, bearings that are arranged to allow the positioners to rotate, a positioner driving means that forces the positioners to rotate and make magnetic heads move to a predetermined position on the surface of recording media of the disks, a base and cover that constitute a disk enclosure in combination with each other, and circuits for controlling at least the disk driving means, read/write operations of the magnetic heads and the positioner driving means. In this case, the above circuits are composed of a flexible printed circuit board to be contained in the disk enclosure, and consequently the height of the magnetic disk drive is less than 10.5 mm.

Further preferably, the flexible unitary magnetic head described before is used as the above magnetic head. In this case, the storage capacity of the disk drive can become greater than 120 MByte.

BRIEF DESCRIPTION OF THE DRAWINGS

The above object and features of the present invention will be more apparent from the following description of the preferred embodiments with reference to the accompanying drawings, wherein:

FIG. 5 is a top view of a larger portion of the magnetic disk drive of FIG. 4, made according to the present invention;

FIG. 6 is a front view of the part of the magnetic disk drive shown in FIG. 5;

FIG. 7 is an enlarged front view of a unitary magnetic head used in the apparatus of FIGS. 5 and 6;

FIG. 39 is an enlarged perspective view of a portion of the apparatus shown in FIG. 36.

DESCRIPTION OF THE PREFERRED EMBODIMENTS

Before describing the embodiments of the present invention, the related disadvantages will be described with reference to the related figures.

Figure 1:
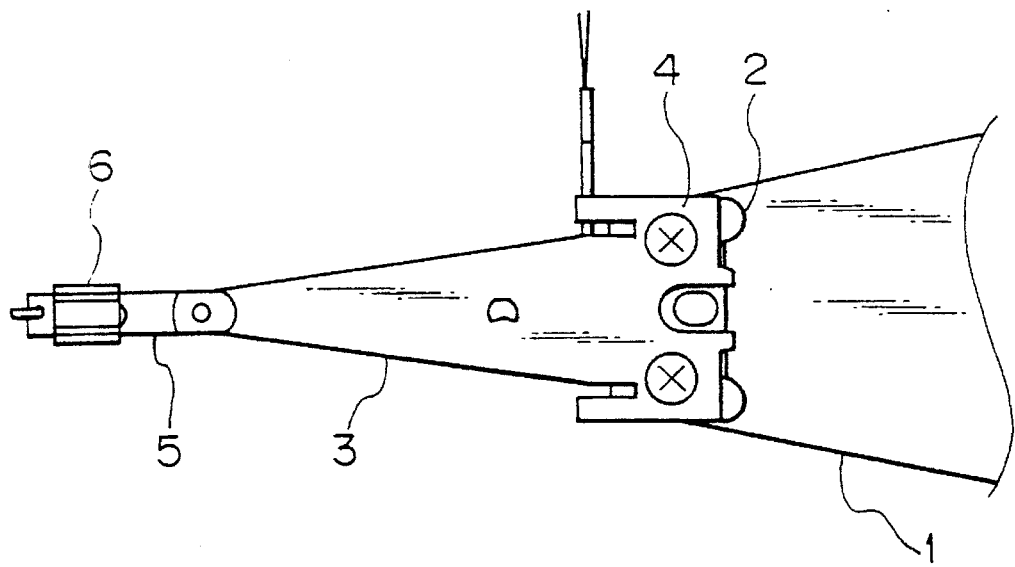
FIG. 1 is a top view of a magnetic head supporting structure for a disk drive according to a prior art.
Figure 2:
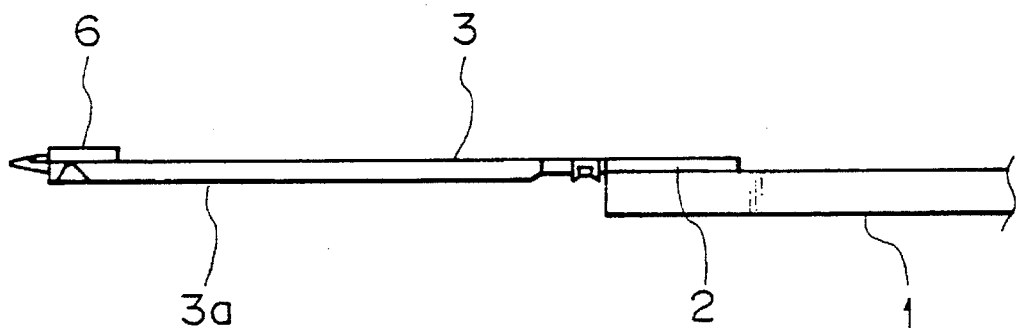
FIG. 2 is a front view of the magnetic head supporting structure of FIG. 1.
Figure 3:
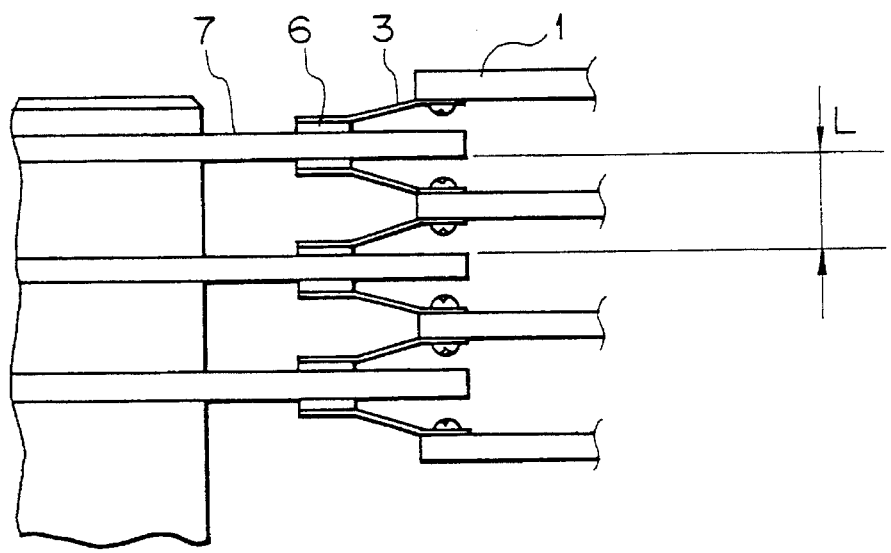
FIG. 3 is a front view of a portion of a magnetic disk drive, including the magnetic head support structure shown in FIG. 1.

FIGS. 1, 2 and 3 are views showing a disk drive having a magnetic head supporting structure according to a prior art. To be more specific, FIG. 1 is a top view showing the magnetic head supporting structure and FIG. 2 is a front view showing the magnetic head supporting structure and FIG. 3 is a front view showing the main part of the magnetic disk drive including the magnetic head supporting structure. In this case, positioners that support arms are omitted to simplify the explanation.

In these figures, an arm 1, which is fixed on each of the positioners and driven by each positioner so that the arm 1 can traverse the track of the corresponding disk 7, is provided for each disk. Further, a base end portion of each suspension element 3 is fastened to the tip portion of each arm 1, via a spacer 2, with screws 4. In this case, the above suspension element is formed by bending an extremely thin stainless steel sheet to form the main part of a supporting member. Here, the spacer 2 is utilized as reinforcing material for the suspension element 3. Further, on both sides of the suspension element 3, bent portions 3a are formed respectively to ensure the stiffness of the above suspension element. Further, each reproducing/recording element, e.g., magnetic head 6 is attached to the tip end portion of each suspension element 3, via gimbal 5 functioning as a part of the supporting members. Further, as shown particularly in FIG. 3, a number of disks 7 are arranged rotatably with high speed in a laminated manner with equally divided spaces respectively. Each magnetic head 6 is fixed in close proximity to the surface of the corresponding disk 7, so that the former can perform data read/write operations for the track of each disk.

In such a magnetic disk drive construction according to the above prior art, in order to increase the maximum sheets of disks 7 that can be assembled in a given place within a disk enclosure (not shown in FIG. 1, 2 and 3), it appears reasonable that the thickness of arms 1 should be decreased so that the distance between the surfaces of adjoining disks 7 become shorter. However, when the above distance is too short, the bent portions 3a of adjoining suspension elements 3 are likely to interface and come into contact with each other. Therefore, it is difficult for the distance between the surfaces of adjoining disks to be reduced below a fixed value. Furthermore, since the thickness of each magnetic head 6 and spacer 2, etc., are also restricted to some degree, it becomes more difficult for the distance between the surfaces of adjoining disks to be reduced to a value less than the limited value (for example, 3 mm). Consequently, when the thickness of a disk drive is predetermined, the prior art shown in FIGS. 1, 2 and 3 has a disadvantage in that the sheets of disks 7 cannot be increased much more than the limited value. On the contrary, when the number of sheets of disks 7 assembled are predetermined (for example, one or two sheets of disks), the conventional disk drive has another disadvantage in that the thickness of the disk drive cannot be reduced less than the limited value, since the space within a disk enclosure cannot be utilized effectively.

Figure 4:
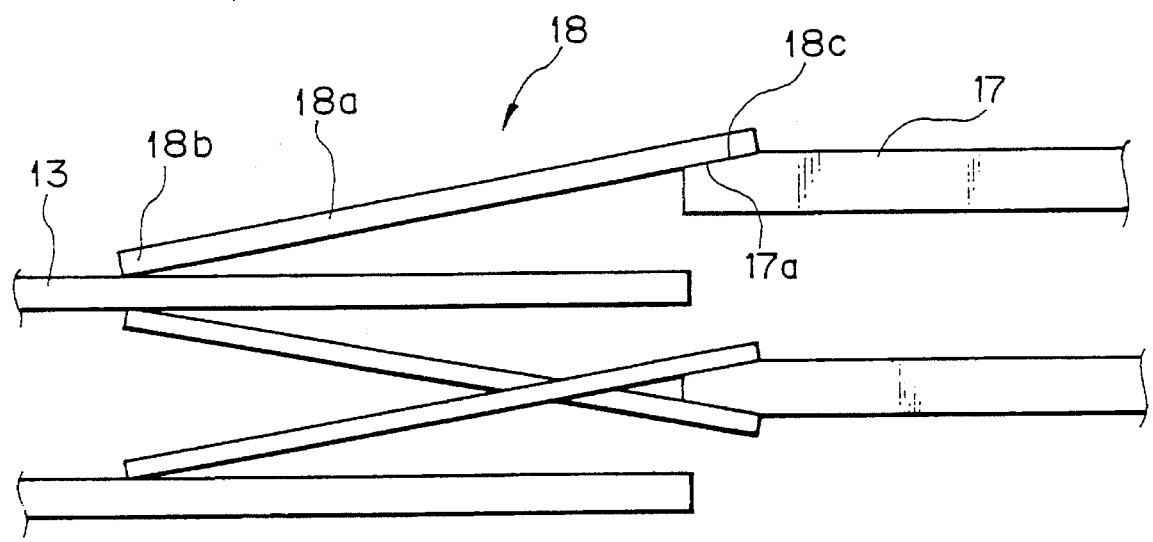
FIG. 4 is a simplified front view of a portion of a disk drive made in accordance with a first preferred embodiment of the present invention.
Figure 8:
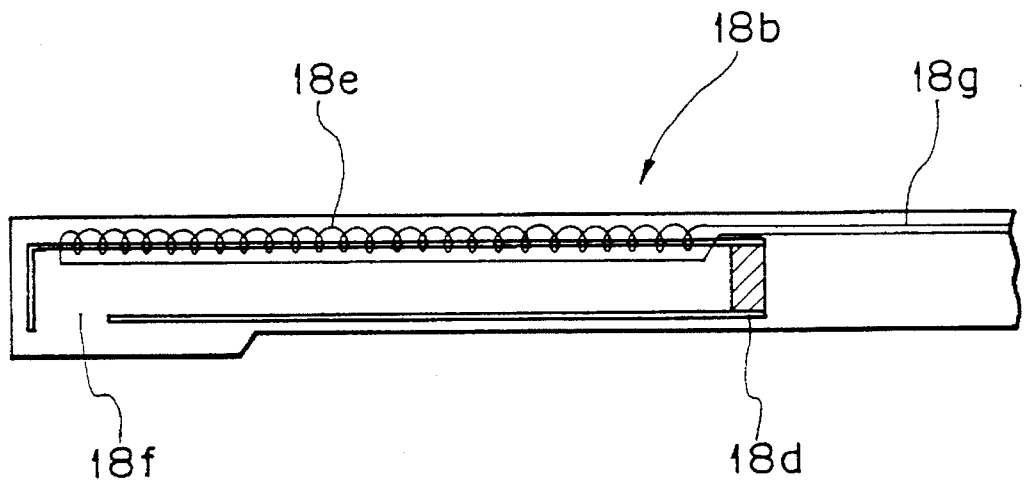
FIG. 8 is an enlarged internal view of the unitary magnetic head shown in FIG. 7.
Figure 9:
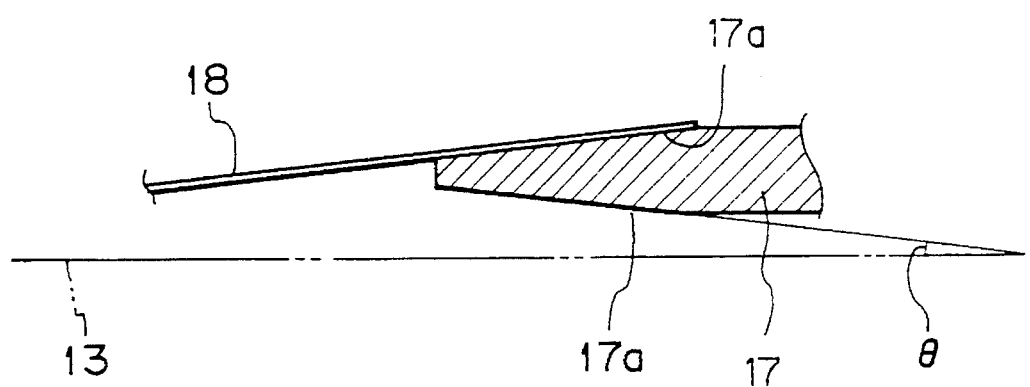
FIG. 9 is an enlarged sectional view taken along lines 9—9 of FIG. 5.
Figure 10:
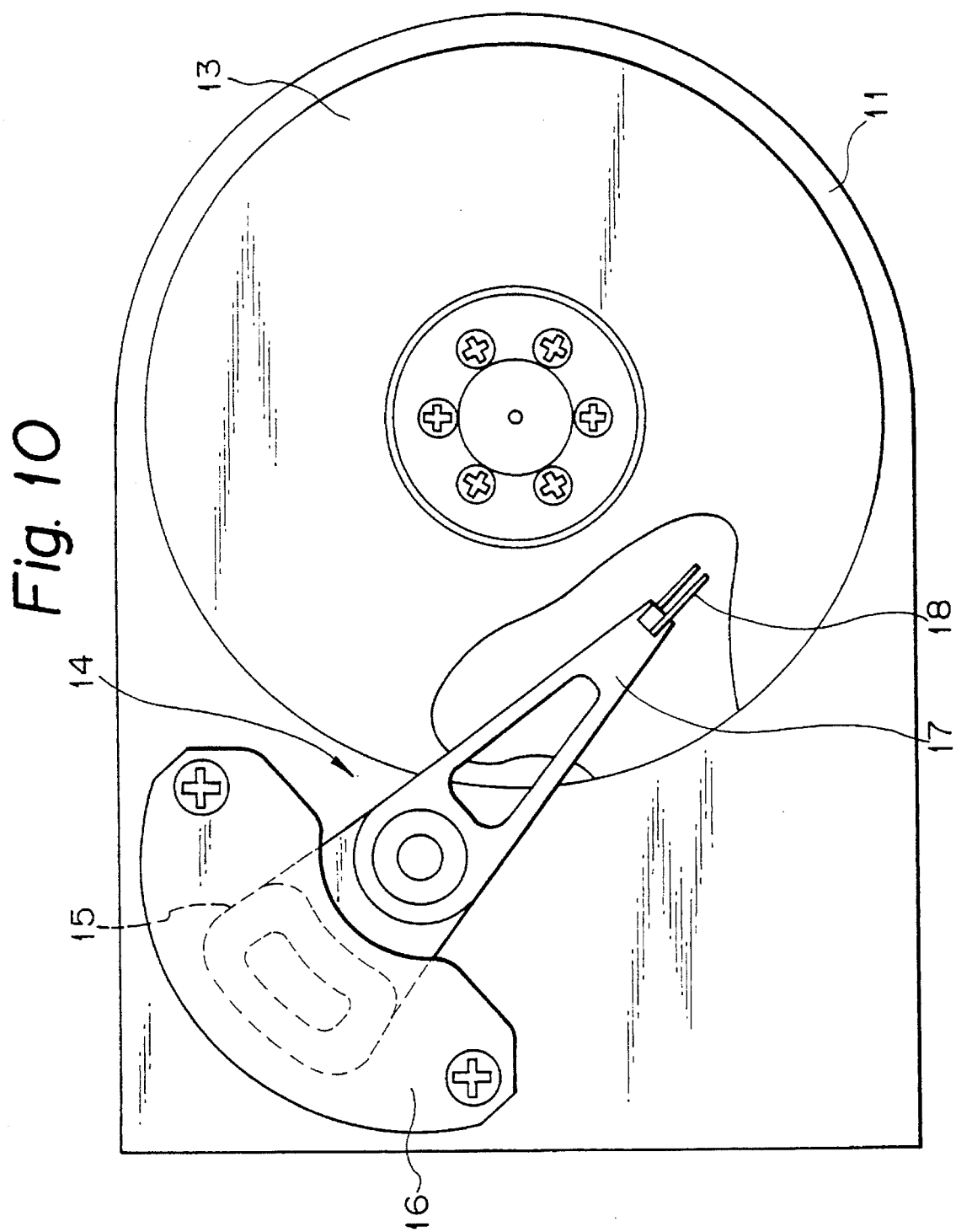
FIG. 10 is a top view of a magnetic disk drive made according to a first preferred embodiment of the present invention.
Figure 11:
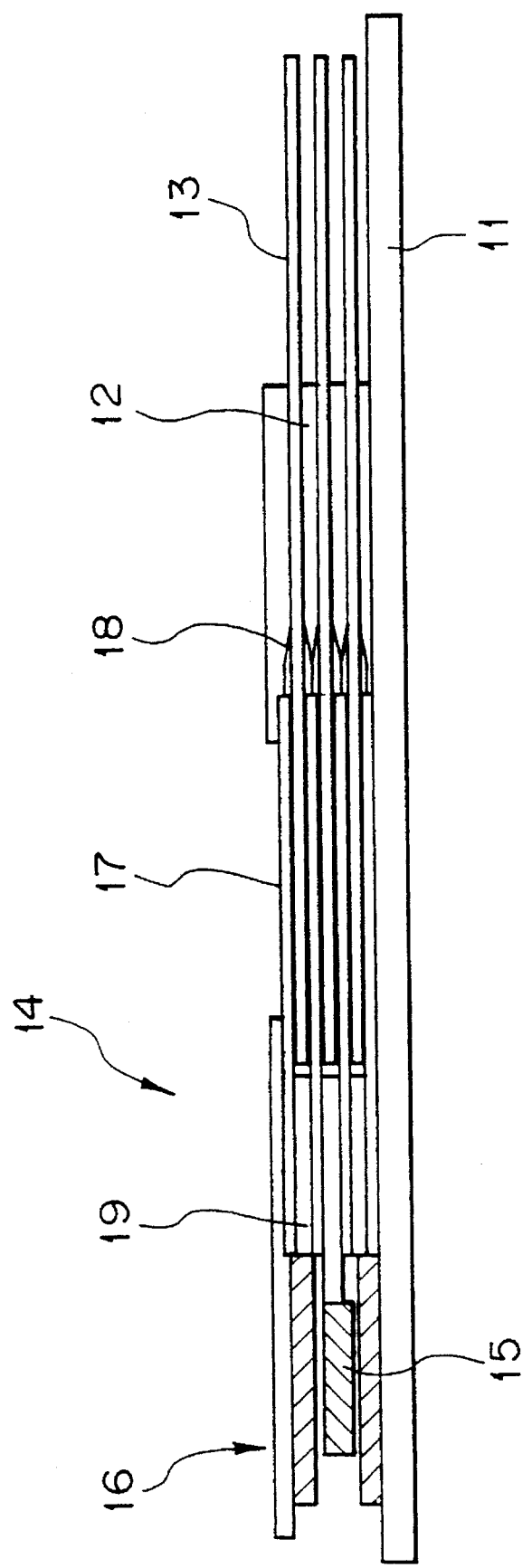
FIG. 11 is a front sectional view of the magnetic disk drive of FIG. 10, taken along lines 11—11 in FIG. 10.

FIGS. 4 to 11 are views showing a first preferred embodiment of a disk drive according to the present invention. To be more specific, FIG. 4 is a simplified front view showing the characteristics of the present invention; FIG. 5 is a top view showing the main part of the magnetic disk drive; FIG. 6 is a front view of FIG. 5; FIG. 7 is an enlarged front view showing a unitary magnetic head of FIG. 6; FIG. 8 is an enlarged sectional view showing a unitary magnetic head of FIG. 7; FIG. 9 is an enlarged sectional view taking along 9—9 of FIG. 5; FIG. 10 is a top view showing the whole structure of the magnetic disk drive and FIG. 11 is a front view of FIG. 10. In some of FIGS. 4 to 11, positioners 14 are partially omitted to simplify the drawings.

First, the whole structure of a preferred embodiment of the present invention will be explained with reference to FIGS. 4 to 11. In these figures, 11 denotes a base of the magnetic disk drive. On this base 11, plural sheets of disks (in FIG. 11, three sheets of disks are illustrated) are rotatably arranged in a laminated manner. These plural sheets of disks 13 are constructed to be driven rotatably at a high speed (for example, 3600 r.p.m.) by a spindle motor, which is representative of a disk driving means not shown in these figures.

Further in these figures, 14 denotes positioners that are mounted rotatably on a base 11 and movable in the direction of the tracks of the disks 13 respectively, so that the respective ends of the positioners can traverse the tracks.

A coil 15 is provided on the respective rotatable opposite ends of the positioners 14. More specifically, the above coil 15 is arranged inside the magnetic gap of a magnetic circuit 16 that is formed on the base 11. In this case, when an electric current is supplied to the above coil 15, a driving force is induced in the coil 15 and then a VCM (voice coil motor), which comprises the above coil 15 forces the positioners 14 to rotate. Thus the coil 15 operates as a positioner driving means.

Further, in the positioners 14, a plurality of arms (in FIG. 11, four arms) 17 that extend toward the respectively corresponding surfaces of recording media of disks 13 are fixed. To be more concrete, the arms 17 are arranged in a laminated manner around a rotational axis of the positioners 14. On one tip portion of the arms 17 are arranged reproducing/recording elements that perform data read/write operations for the surfaces of recording media of the disks, respectively.

Next, the above reproducing/recording elements will be explained in more detail, with reference to FIGS. 4 to 9. On one end of each of the arms 17 and in the other surface thereof opposite one surface thereof confronting the corresponding surface of the recording medium of the disk 13, a tapered surface 17a is arranged as a sloping surface. The above tapered surface 17a is formed so that the thickness of each of the positioners 14 in the direction of lamination of the disks can be decreased gradually toward the most leading portion of one end of each arm 17. Further, a base end portion of each reproducing/recording element is fixed on the tapered surface 17a. In this case, a tapered angle θ (see FIG. 9) is formed so that it is 5 to 10 degrees to the corresponding surface of the disk 13.

In the first preferred embodiment and the other embodiments described hereinafter, typically, an integrated unitary magnetic head 18 shown in FIG. 4 is utilized as the reproducing/recording element (for example, see U.S. Pat. No. 5,041,932, or announcement by Censtor Corporation in Data Storage 90 An International Forum; Sep. 10–12, 1990 Fairmont Hotel San Jose, Calif.). Henceforth, the above integrated unitary magnetic head 18 will be described in detail with reference to the related figures. The integrated unitary magnetic head 18 consists of a flexible thin sheet body 18a, such as a laminated sheet of Aluminium Oxide ($Al_2O_3$), a head portion 18b that is located on one tip portion of said body 18a and has an air gap for reproducing or recording on one surface of the body 18a, and a mounting portion 18c formed on the opposite tip portion of the body 18a.

Further, the total weight of the integrated unitary magnetic head 18 is approximately 1 mg, which is much less than a conventional MIG (metal in gap) magnetic head. In the first preferred embodiment, as shown in FIG. 6, it is designed such that the distance t (see FIG. 6) between the surface of the disk 13 and the surface of the corresponding arm 17 that confronts the surface 13 of the disk 13 in a direction of lamination of the disk 13 should be 0.3 to 0.6 mm.

Further, it is also designed such that the positioner 14 should be flexible with the range of 0.3 to 0.6 mm in a direction of lamination of the disk 13, when the integrated unitary magnetic head 18 is fixed on the tapered surface 17a.

Further, in the first preferred embodiment, with regard to the method for fixing the unitary magnetic head 18, a method utilizing a thermohardening adhesive or a method utilizing spot welding by laser or the like seems reasonable. In this case, the fixing process of the unitary magnetic head 18 is preferably executed by using a thermohardening adhesive. To be more concrete, first, the mounting portion 18c is mounted provisionally on the tapered surface 17a of the arm 17 by means of a thermohardening adhesive. Next, after locating the unitary magnetic head 18, the adhesive is heated to the curing temperature to become sufficiently hard.

Further, the head portion 18a of the unitary magnetic head 18 will be described in more detail with reference to FIG. 8. The above head portion 18a consists of a yoke 18d, a coil 18$3$ wound on the yoke 18d and an air gap 18f formed between both ends of the yoke 18d.

Here, with reference to FIGS. 12 and 13, two methods for laying lead wires of the unitary magnetic head 18 will be described respectively.

Figure 12:
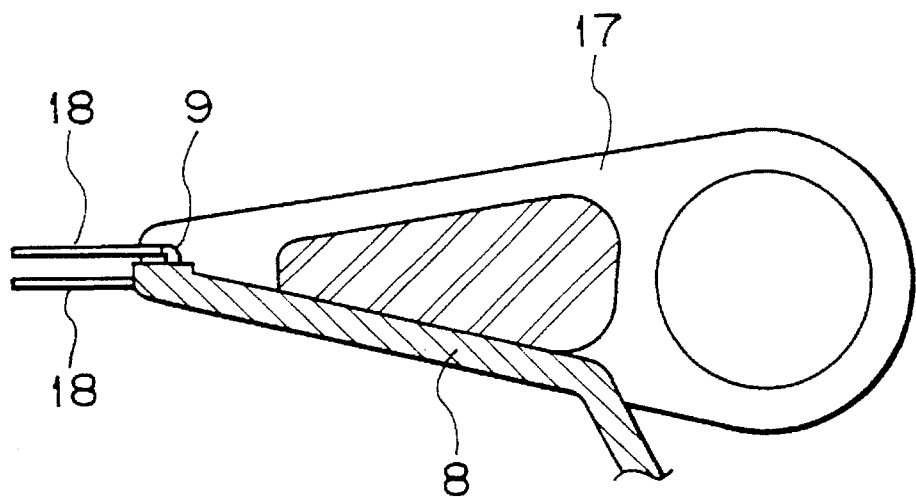
FIG. 12 is a partial sectional top view of a first example of an arrangement of lead wires for the unitary magnetic head shown in FIGS. 5 and 6, taken along lines 12–13, 12–13 in FIG. 6.

In a first example shown in FIG. 12, an FPC (flexible printed circuit board) 8 is arranged from one tip portion toward the opposite tip portion of one side area on one surface of the arm 17. Further, the lead wires 9 extending from each of the unitary magnetic heads 18 is connected to one end of the corresponding FPC 8.

Figure 13:
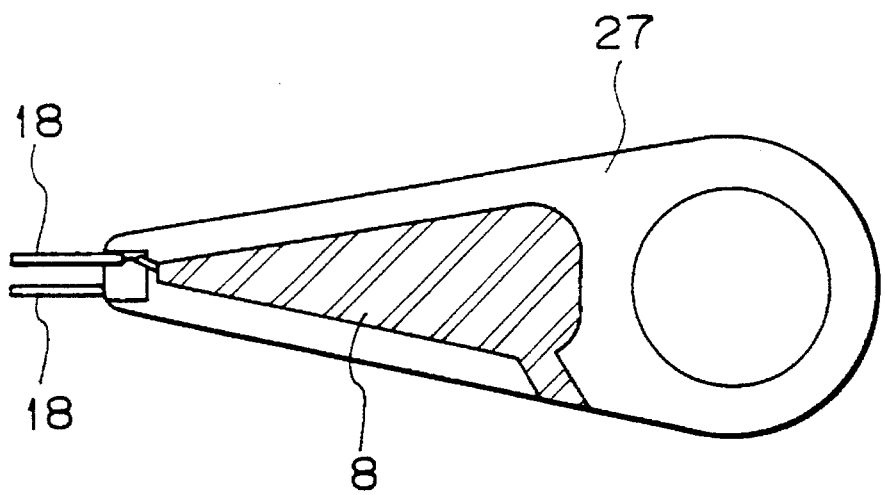
FIG. 13 is a partial sectional top view of a second example of an arrangement of lead wires for the unitary magnetic head in FIGS. 5 and 6, taken along lines 12–13, 12–13 in FIG. 6.

In a second example shown in FIG. 13, FPC 8 is arranged from one tip portion toward the opposite tip portion of one central area on one surface of the arm 17.

Further, lead wires 9 extending from each of the unitary magnetic heads 18 are connected to one end of the corresponding FPC 8.

In FIGS. 4 to 11 again, a sequence of operations for the construction of a disk drive according to the first preferred embodiment will be described. In this case, each disk 13 is driven rotationally by a spindle motor as a disk driving means (not illustrated in these figures).

First, when an electric current is supplied to the coil 15, which is arranged inside the magnetic gap of a magnetic circuit 16, a driving force is induced in the coil 15 and then each positioner 14 is driven rotationally for the base 11. Next, each positioner 14 is rotated and therefore the head portion 18b of the unitary magnetic head 18 gains access to a desired track of the corresponding disk 13 and finally data read/write operations are performed for the above disk 13.

In such a construction, a suspension element and spacer is not necessary, which is different from the construction according to a prior art. Further, a mounting portion 18b of an integrated unitary magnetic head 18 of a thin sheet is fixed on a tapered surface 17a. Here, this tapered surface 17a is formed so that the thickness of each positioner 14 (or arm 17) in the direction of lamination of disks can be decreased gradually toward the most leading portion of one end of the positioner 14 (or arm 17).

Consequently, it becomes theoretically possible for the distance between adjoining disks 13 to be only slightly larger than the thickness of the arm 18. To be more concrete, in the construction according to a prior art, the distance between adjoining disks is approximately 3 mm at the most. On the contrary in the construction according to a first preferred embodiment, the distance between the disks can be reduced to a value as small as 1.5 to 2.5 mm.

Further, in the prior art, the total weight of the head supporting structure including a magnetic head, a suspension element, a gimbal and a spacer is approximately 300 mg, whereas, the weight of an integrated magnetic head can be reduced to a value of approximately 1 mg. Further, owing to the reduction of weight in an integrated unitary magnetic head, the rigidity of the arm 17 can be reduced, which leads to the reduction of the weight of the arm 17. Consequently, the moment of inertia can be remarkably reduced, and the data access at a higher speed can be performed, compared with a prior art.

Figure 14:
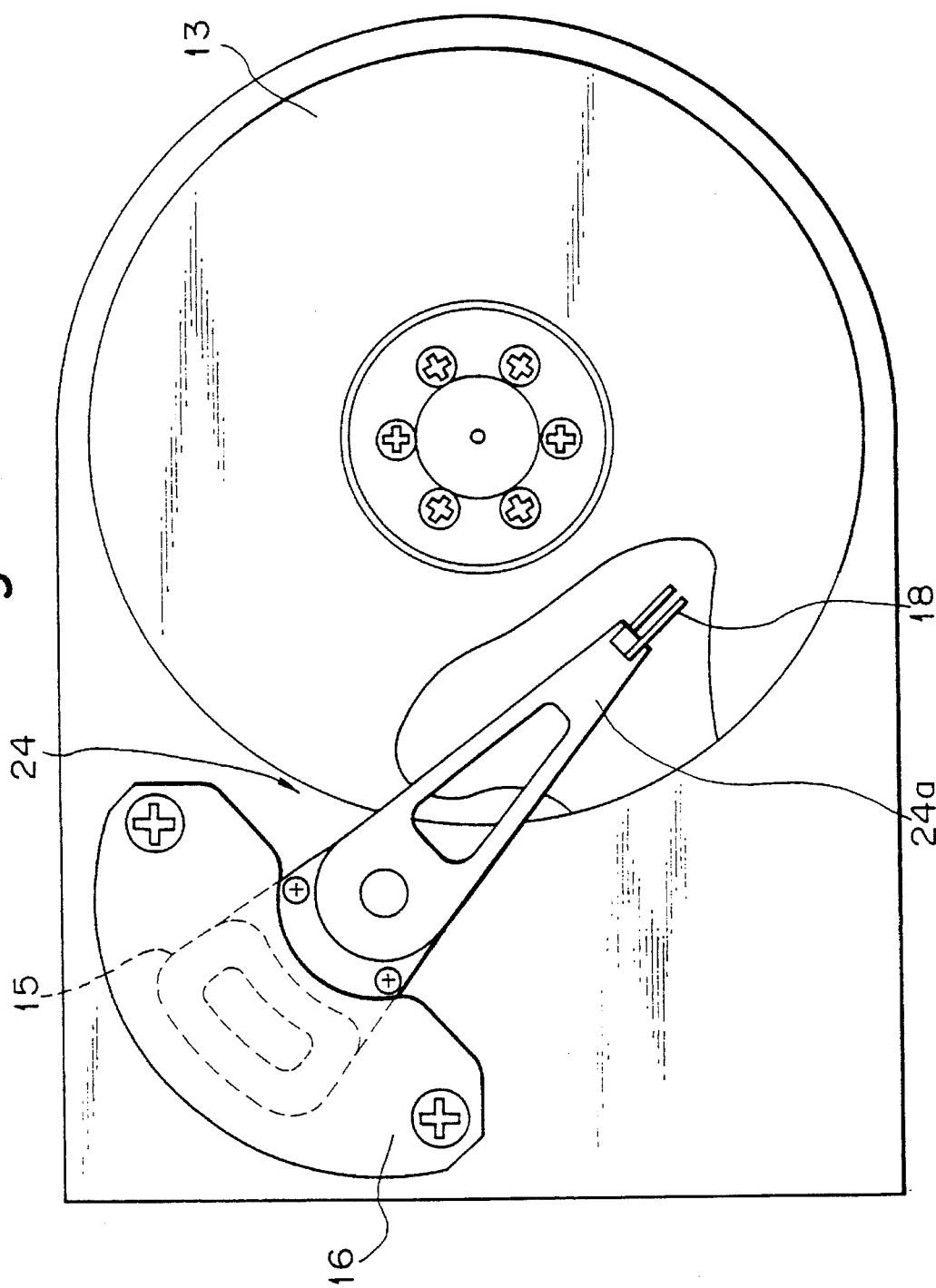
FIG. 14 is a top view of a second preferred embodiment of a magnetic disk drive made according to the present invention.
Figure 15:
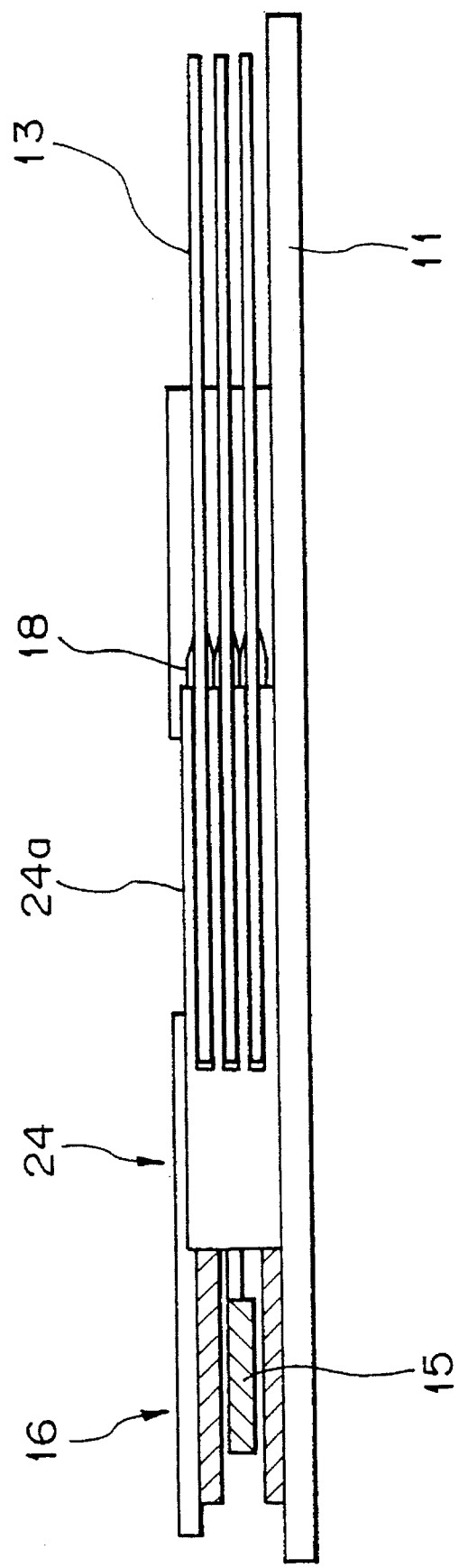
FIG. 15 is a front sectional view of the apparatus of FIG. 14, taken along lines 15—15 in FIG. 14.

FIGS. 14 and 15 are views showing a second preferred embodiment of a disk drive according to the present invention. To be specific, FIG. 14 is a top view showing the whole structure of the magnetic disk drive and FIG. 15 is a front view of FIG. 14. Henceforth, any component that is the same as that mentioned before will be referred to using the same reference number.

As shown in FIGS. 14 and 15, the construction of a disk drive in a second preferred embodiment is similar to that of a disk drive in a first preferred embodiment. However, the structure of positioner 24 of the second embodiment is different from that of the first embodiment. To be more specific, in the first embodiment, the arms 17 of the positioners 14 and the spacers 19 are laminated alternately and the arms 17 are composed of different members from the positioners 14. On the contrary, in the second embodiment, arm portions 24a functioning as the arms 17 described before are integrated with positioners 14, respectively. In this case, the above arm portions 24a can be fabricated by means of cutting.

The above second embodiment has the same advantage as the first embodiment, particularly in that the distance between adjoining disks can be reduced and the weight of the head supporting member can be remarkably decreased.

Figure 16:
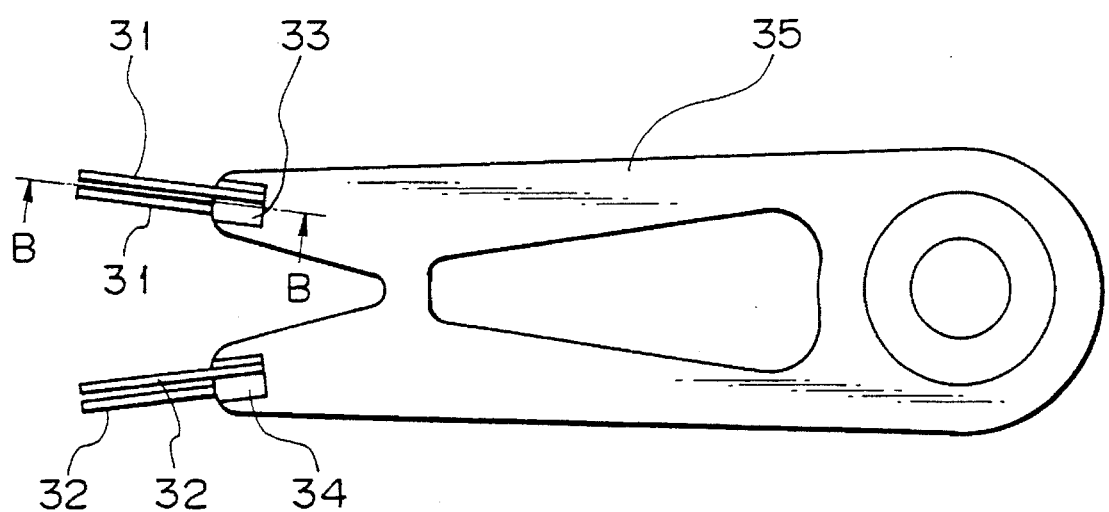
FIG. 16 is a top view of a portion of a third preferred embodiment of a magnetic disk drive made according to the present invention.
Figure 17:
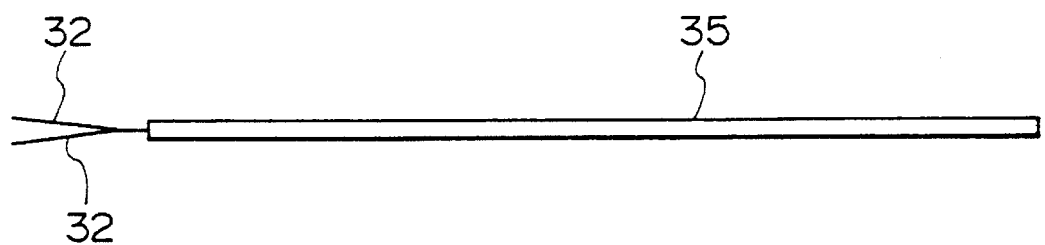
FIG. 17 is a front view of the apparatus of FIG. 16.
Figure 18:
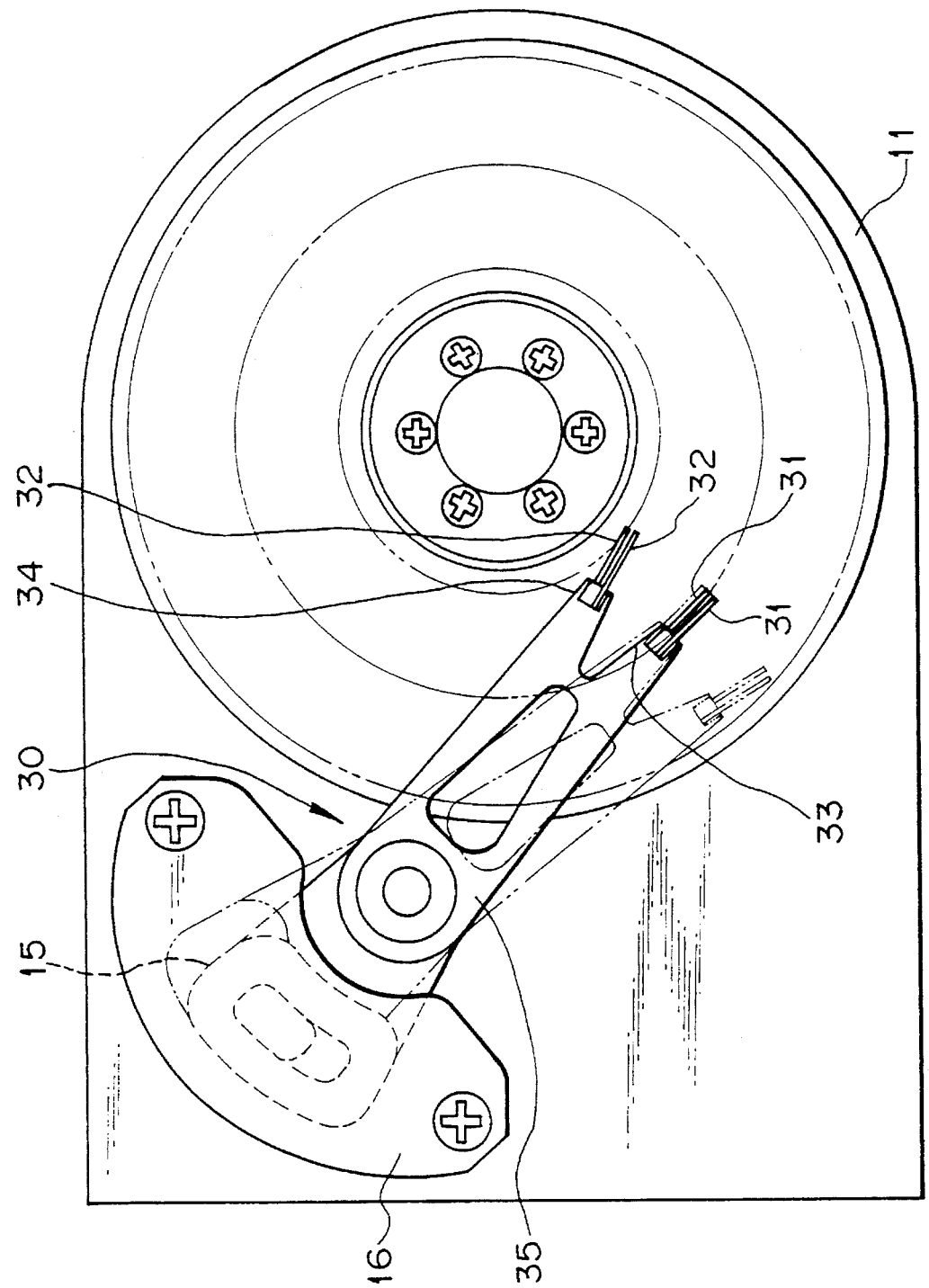
FIG. 18 is a top view of a magnetic disk drive made according to the third preferred embodiment of the present invention.
Figure 19:
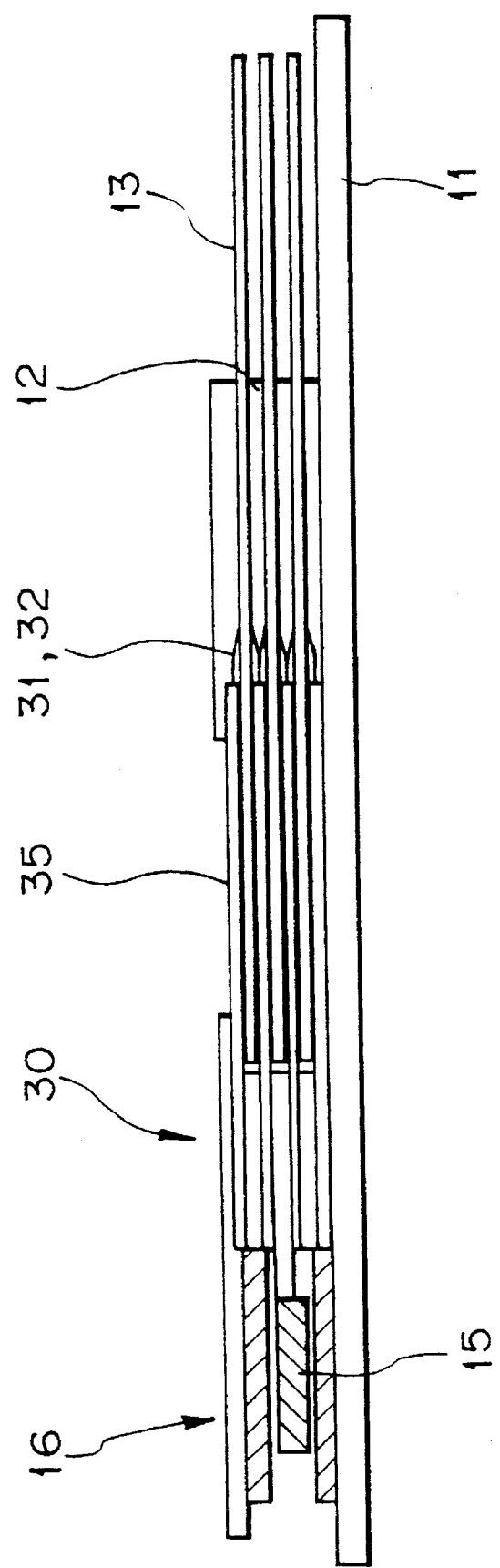
FIG. 19 is a sectional view of the apparatus shown in FIG. 18, taken along lines 19—19 in FIG. 18.
Figure 20:
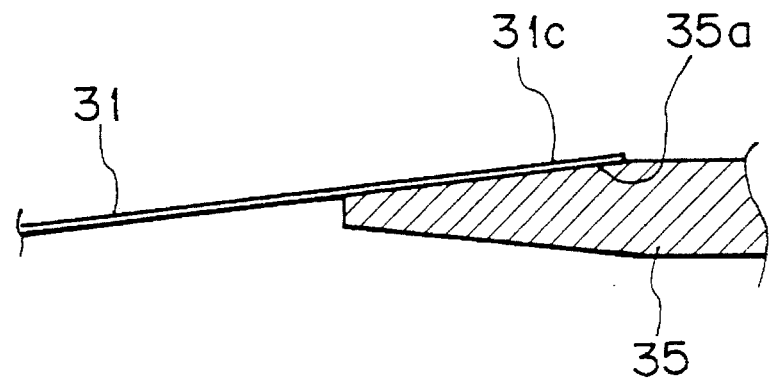
FIG. 20 is an enlarged sectional view taken along lines 20—20 of FIG. 16.

FIGS. 16 to 20 are views showing a third preferred embodiment of a disk drive according to the present invention. To be more specific, FIG. 16 is a top view showing the main part of the magnetic disk drive; FIG. 17 is a front view of FIG. 16; FIG. 18 is a top view showing the whole structure of the magnetic disk drive; FIG. 19 is a front view of FIG. 18 and FIG. 20 is an enlarged sectional view taken along B—B of FIG. 16.

As is apparent from these figures, the structure of positioners 30 of the second embodiment is different from that of the first embodiment. To be more specific, in FIG. 16 to 20, one end of each of the arms 35 of the positioners 30 is divided into two branches, and a first tapered surface part 33 and second tapered surface part 34 are formed in respective end positions of the branches, on which said first unitary magnetic head unit 31 and second unitary magnetic head unit 32 are fixed respectively, so that said first and second unitary magnetic head units 31, 32 can perform read/write operations for the internal peripheral part and the external peripheral part of the tracks of each disk 13, respectively.

In such a construction, a plurality of unitary magnetic heads can be used simultaneously at each disk, read/write operations can be performed at a higher speed than the conventional disk drive and access time is shortened. In this case, the construction of the first and second unitary magnetic head units 31, 32 is the same as the unitary magnetic head 18 in the first preferred embodiment.

Further, in FIGS. 16 to 20, the first and second sloping surface parts 33, 34 are arranged on two ends of each of the arms 35 formed in branches and on the other surface of each arm 35 opposite one surface thereof confronting the corresponding surface of the recording surface of the recording medium of the disk 13. In this case, the above first and second tapered surface parts 33, 34 are formed respectively so that the thickness of the two branches of each arm 35 in the direction of lamination of the disk 13 can be decreased gradually toward two respective leading positions of each arm 35.

Further preferably, the above first and second unitary magnetic head units 31, 32 further have pairs of unitary magnetic head portions, respectively. Namely, four unitary magnetic heads are arranged in each of the arms of the positioners. In such a construction, the access time of a whole disk drive is shortened significantly and a memory device with an extremely high speed can be attained.

Figure 21:
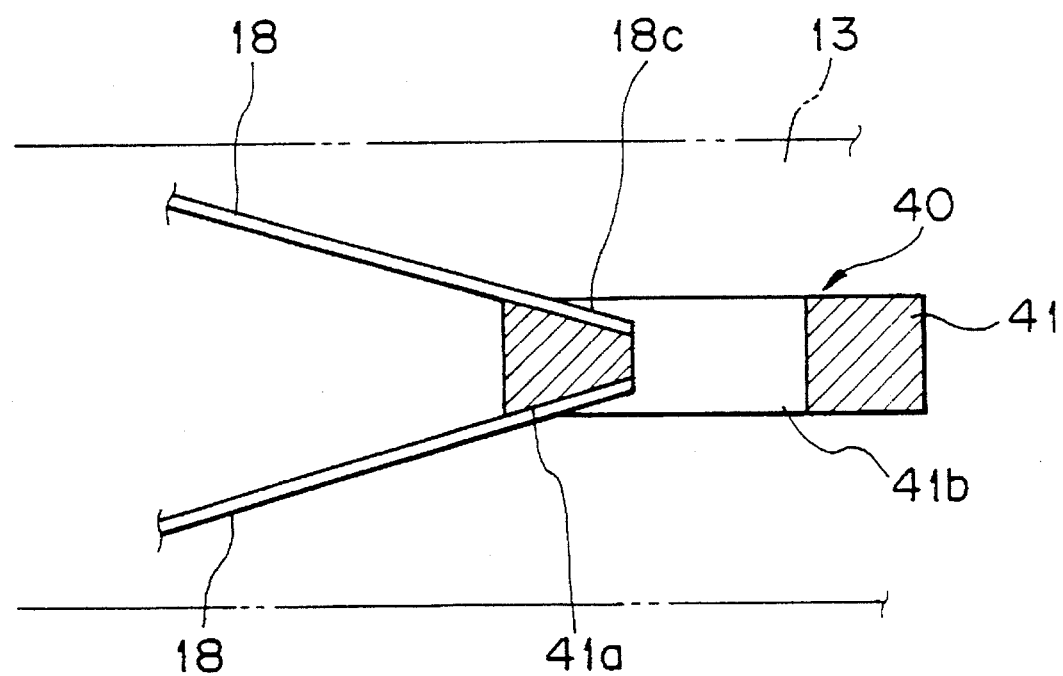
FIG. 21 is a partial sectional view of a portion of a disk drive made according to a fourth preferred embodiment of the present invention.
Figure 22:
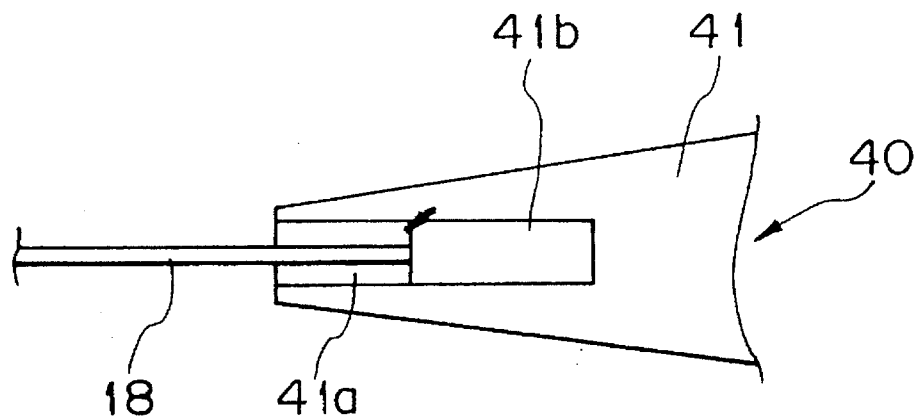
FIG. 22 is a top view of the apparatus of FIG. 21.

FIGS. 21 and 22 are views showing a fourth preferred embodiment of a disk drive according to the present invention. To be more specific, FIG. 21 is a partial sectional view showing the main part of a disk drive and FIG. 22 is a top view of FIG. 21.

As is apparent from FIGS. 21 and 22, the structure of the positioners 40 of the fourth embodiment is different from that of the first embodiment. To be more specific, in FIGS. 21 and 22, a tapered surface 41a is arranged on one end of each of the arms 41 of the positioners 40 and on one surface confronting the corresponding surface of the recording medium of the disk. Here, this tapered surface 41a is formed so that the thickness of each of the positioners 40 in the direction of lamination of the disks 13 can be increased gradually toward the most leading position of one end of each arm 41. Further, a mounting portion 18c of an integrated unitary magnetic head 18 of a thin sheet is fixed on the above tapered surface 41a. Further, a hole 41b is formed in each arm 41, to facilitate the fabrication of the tapered surface 41a.

Figure 23:
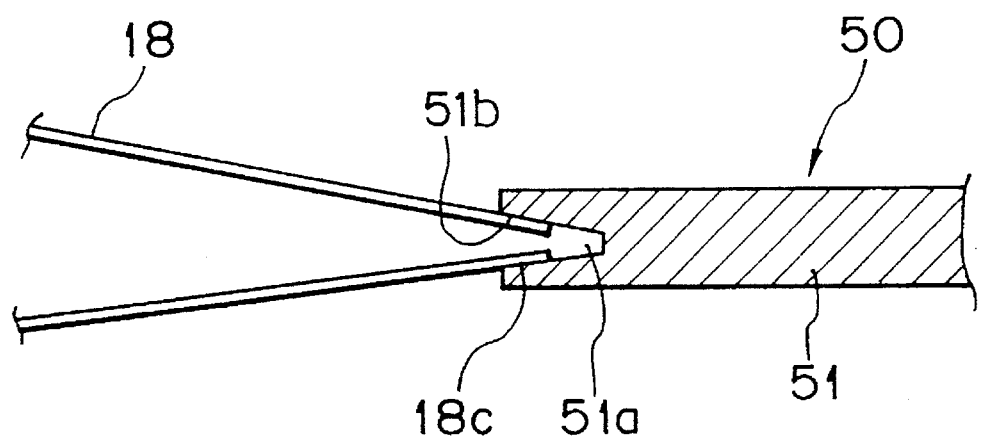
FIG. 23 is a front view of a fifth preferred embodiment of a portion of a disk drive made according to the present invention.

FIG. 23 is a view showing a fifth preferred embodiment of a disk drive according to the present invention.

As is apparent from FIG. 23, the structure of the positioners 50 of the fifth embodiment is different from that of the first embodiment. To be more specific, in FIG. 23, a tapered surface 51b is arranged on an inner wall surface of a cutout groove 51a, which is engraved on one end of each of the arms 51 of the positioners 50. In this case, the opening of the cutout groove 51a narrows gradually in the sectional area as the opening goes from the inlet to the interior. Further, the mounting portion 18c of each of the integrated unitary magnetic heads 18 is fixed on the corresponding tapered surface 51b.

Figure 24:
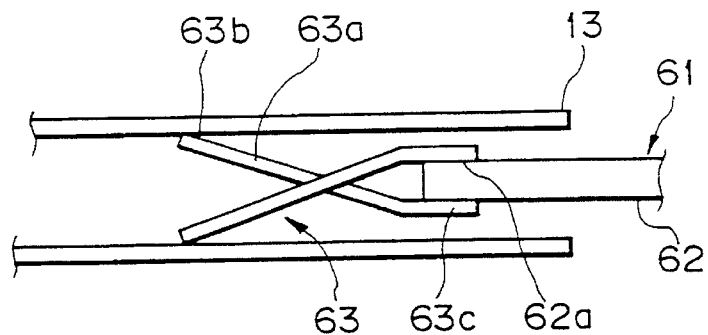
FIG. 24 is a front view of a sixth preferred embodiment of a portion of a disk drive made according to the present invention.

FIG. 24 is a front view showing a sixth preferred embodiment of a disk drive according to the present invention.

As is apparent from FIG. 24, the structure of the positioners 61 and unitary magnetic heads 63 of the sixth embodiment are different from that of the first embodiment.

To be more specific, in FIG. 24, in each one of the ends of the arms 62 of positioners 61 is formed a parallel surface 62a arranged approximately parallel to the surface of a recording modium of each disk 13.

Further, each of the integrated unitary magnetic heads 63 consists of a flexible thin sheet body 63a, a head portion 63b located on one tip portion of the body 63b and having an air gap for reproducing or recording on one surface of the body 63b, and a bent-shaped mounting portion 63c formed on the opposite tip portion of the body 63a. Here, the opposite tip portion is bent back against one tip portion of the body 63a. Further, the bent-shaped mounting portion 63c of each unitary magnetic head 63 is fixed on the corresponding parallel surface 62a of each arm 62.

All of the fourth, fifth and sixth embodiments have the same advantage as the first embodiment in that the distance between adjoining disks can be reduced by utilizing a given inclination of the magnetic head to the surface of the disk, and in that the weight of the head supporting member can be decreased significantly by utilizing an integrated unitary magnetic head.

Figure 25:
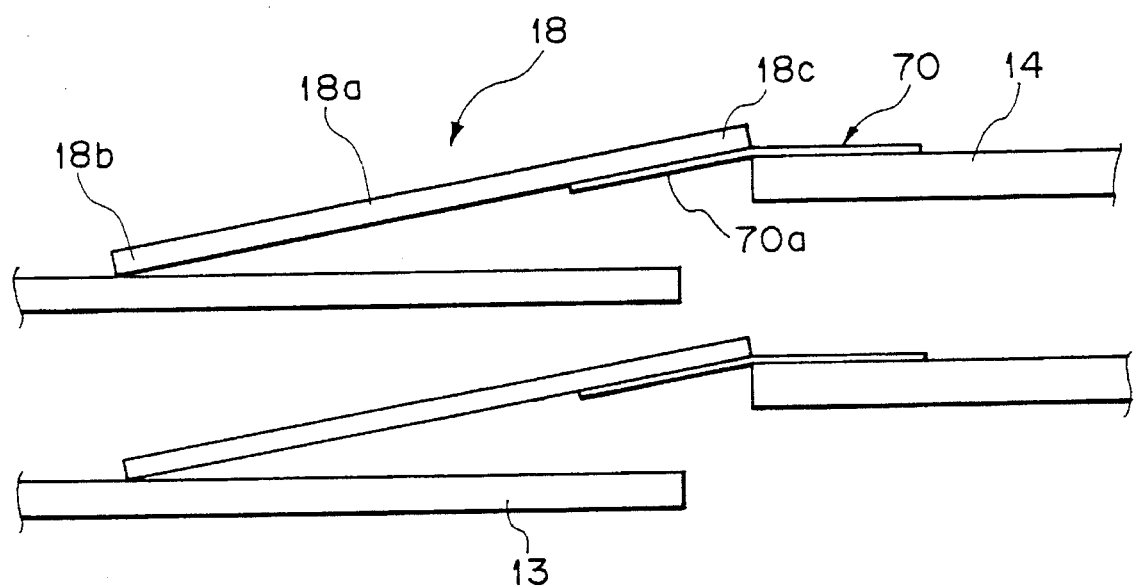
FIG. 25 is a simplified front view of a portion of a seventh preferred embodiment of a disk drive made according to the present invention.
Figure 26:
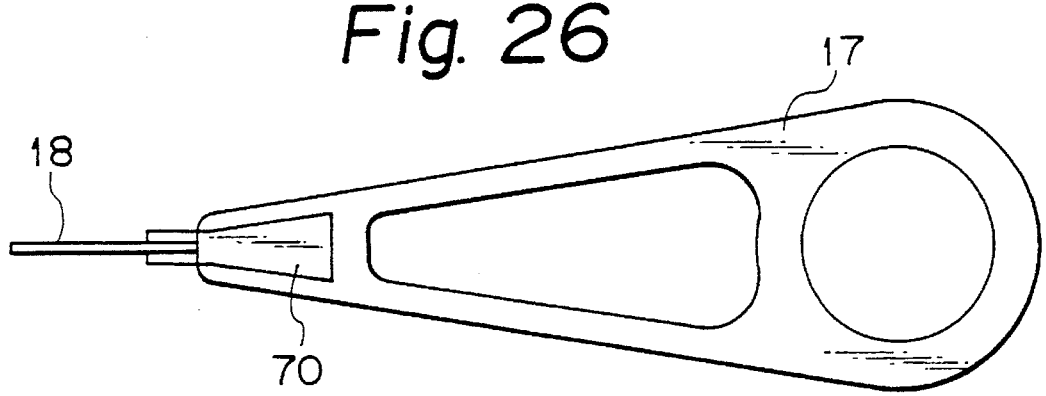
FIG. 26 is a top view of a portion of a magnetic disk drive made according to the seventh preferred embodiment of the present invention.
Figure 27:
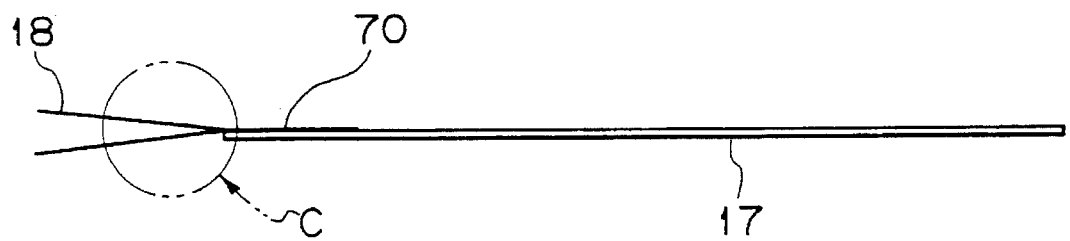
FIG. 27 is a front view of the apparatus shown in FIG. 26.
Figure 28:
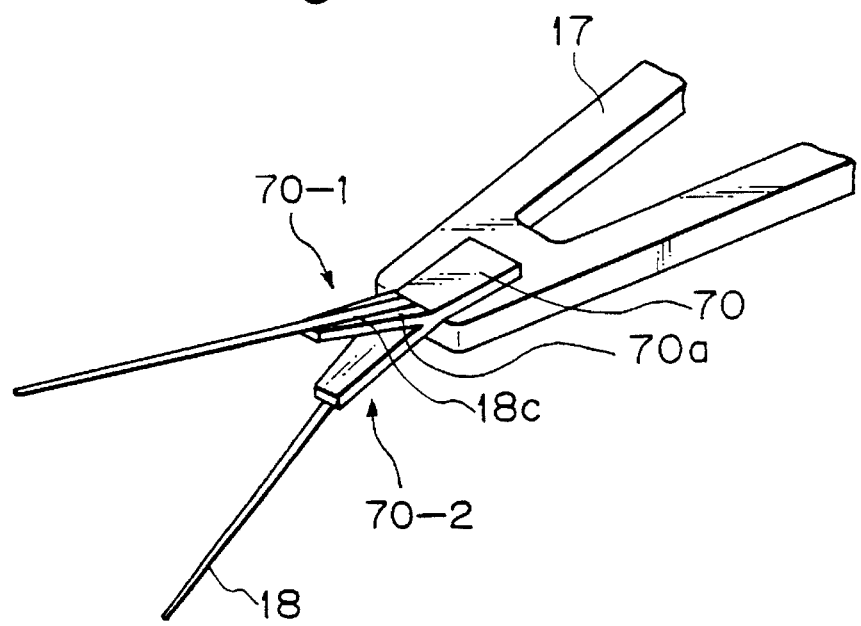
FIG. 28 is an enlarged perspective view of a portion C of the apparatus of FIG. 27.

FIGS. 25 to 28 are views showing a seventh preferred embodiment of a disk drive according to the present invention. To be more specific, FIG. 25 is a simplified front view showing the characteristics of the present invention and FIG. 26 is a top view showing the main part of the magnetic disk drive and FIG. 27 is a front view of FIG. 26 and FIG. 28 is an enlarged perspective view showing portion C of FIG. 27.

As shown in these figures, a head supporting means 70 is provided between each of the unitary magnetic heads 18 and each of the arms 17 of positioners 14, which is different from the above mentioned embodiments.

To be more specific, a base end portion of the above head supporting means 70 is attached on one end of each of the arms 17 of the positioners 14. Further, a sloping surface portion 70a that inclines toward the surface of a recording medium of each of the disks 13 is formed on the tip end portion of each of the head supporting means 70.

In this case, a mounting portion 18c of the integrated unitary magnetic head 18 is constructed to be fixed on the corresponding sloping surface portion 70a. Further, the material properties and dimensions of the head supporting means 70 are selected so that sufficient stiffness for stably supporting the integrated unitary magnetic head 18 can be ensured.

More concretely, in FIG. 28, when one end of the positioner 14 is located between adjoining disks 13 having a laminated arrangement, the above head supporting means 70 includes a first head supporting member 70-1 and a second head supporting member 70-2. The above first supporting member 70-1 is fixed on one end of each of the arms 17 of the positioners 14 and the sloping surface portion 70a, which inclines toward the surface of a recording medium of one of the adjoining disks 13. On the contrary, in the second supporting member 70-2, the opposite tip portion thereof is laminated on the opposite tip portion of the first supporting member 70-1. Further, the sloping surface portion 70a of the above second supporting means 70-2 inclines toward the surface of a recording medium of the other adjoining disks 13.

In this case, a pair of unitary magnetic heads 18 are constructed to be fixed on the sloping surface portions of the first and second head supporting members 70-1, 70-2, respectively.

In such a construction, the size of the head supporting means 70 can be sufficiently small and therefore the distance between adjoining disks 13 becomes much smaller than the prior art, similar to the other preferred embodiment previously described.

Furthermore, in the seventh embodiment, the weight of the head supporting means 70 can be much smaller than that of the other head supporting components, such as arms 17, and therefore the total weight of the head supporting structure can be reduced, significantly similar to the other embodiments.

Figure 29:
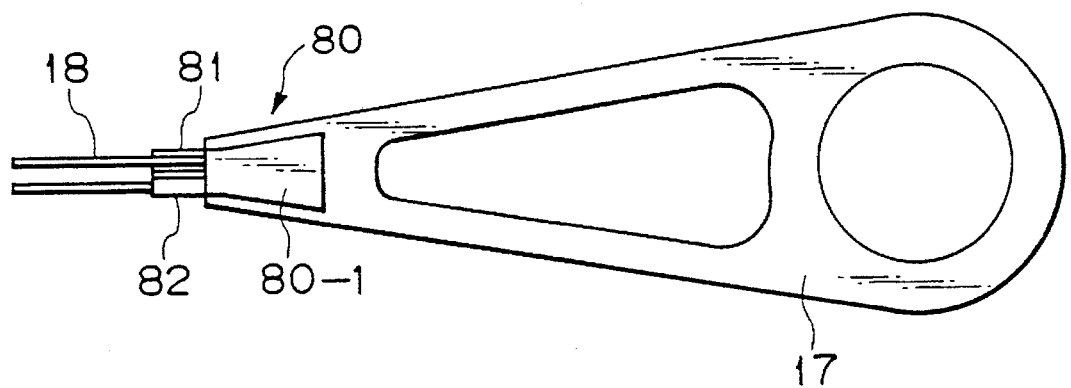
FIG. 29 is a top view of a portion of a magnetic disk drive made according to an eighth preferred embodiment of the present invention.
Figure 30:
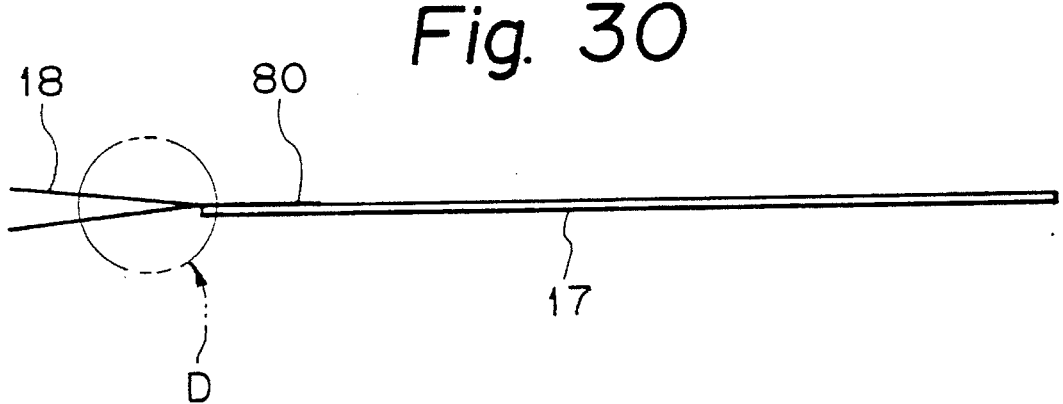
FIG. 30 is a front view of the apparatus of FIG. 29.
Figure 31:
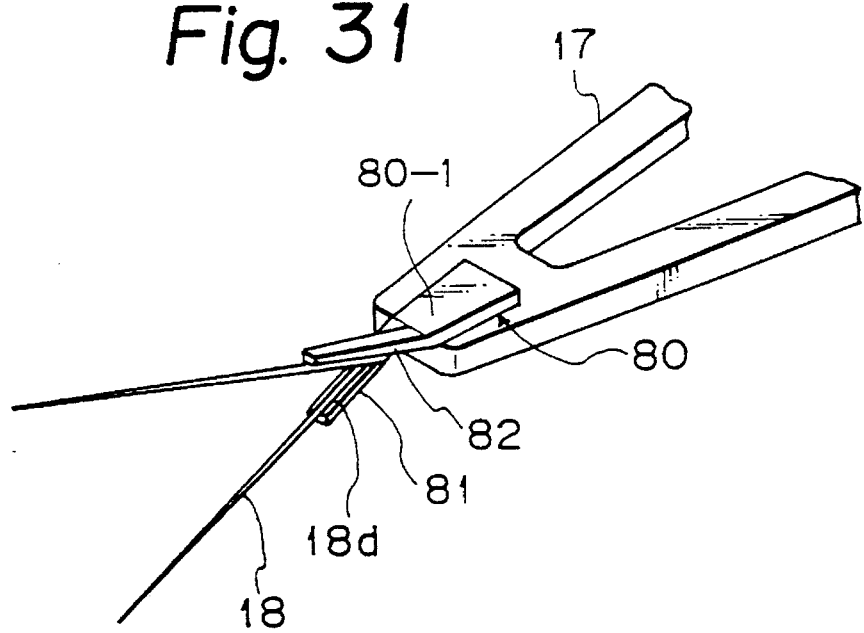
FIG. 31 is an enlarged perspective view of a portion D of FIG. 30.

FIGS. 29 to 31 are views showing an eighth preferred embodiment according to the present invention. To be more specific, FIG. 29 is a top view showing the main part of the magnetic disk drive. FIG. 30 is a front view of FIG. 29 and FIG. 31 is an enlarged perspective view showing portion D of FIG. 30.

As shown in these figures, the configuration of the head supporting means of the eighth embodiment is different from that of the seventh embodiment.

To be more specific, when one end of the positioner 14 is located between adjoining disks 13 having a laminated arrangement, the above head supporting means includes a base end portion 80-1, a first sloping surface part 81 and a second sloping surface part 82. The above base end portion 80-1 is fixed on one end of each of the arms 17 of the positioners 14.

Further, the first sloping surface part 81 extends from the base end portion 80-1 and inclines toward the surface of a recording medium of one of the adjoining disks 13.

Further, the second sloping surface part 82 extends from the base end portion and inclines toward the other adjoining disks 13.

In this case, the first sloping surface part 81 and second sloping surface part 82 are arranged parallel with each other, and a pair of unitary magnetic heads 18 are constructed to be fixed on the first and second sloping surface parts 81, 82, respectively.

Also in such a construction, the distance between adjoining disks 13 becomes much smaller than the prior art and the total weight of the head supporting structure can be reduced, significantly similar to the seventh embodiment. Furthermore in the eighth embodiment, it is not necessary for the head supporting members to be laminated, which is different from the seventh embodiment. Therefore, it becomes possible for the distance between adjoining disks in the eighth embodiment to be smaller than the distance in the seventh embodiment.

Figure 32:
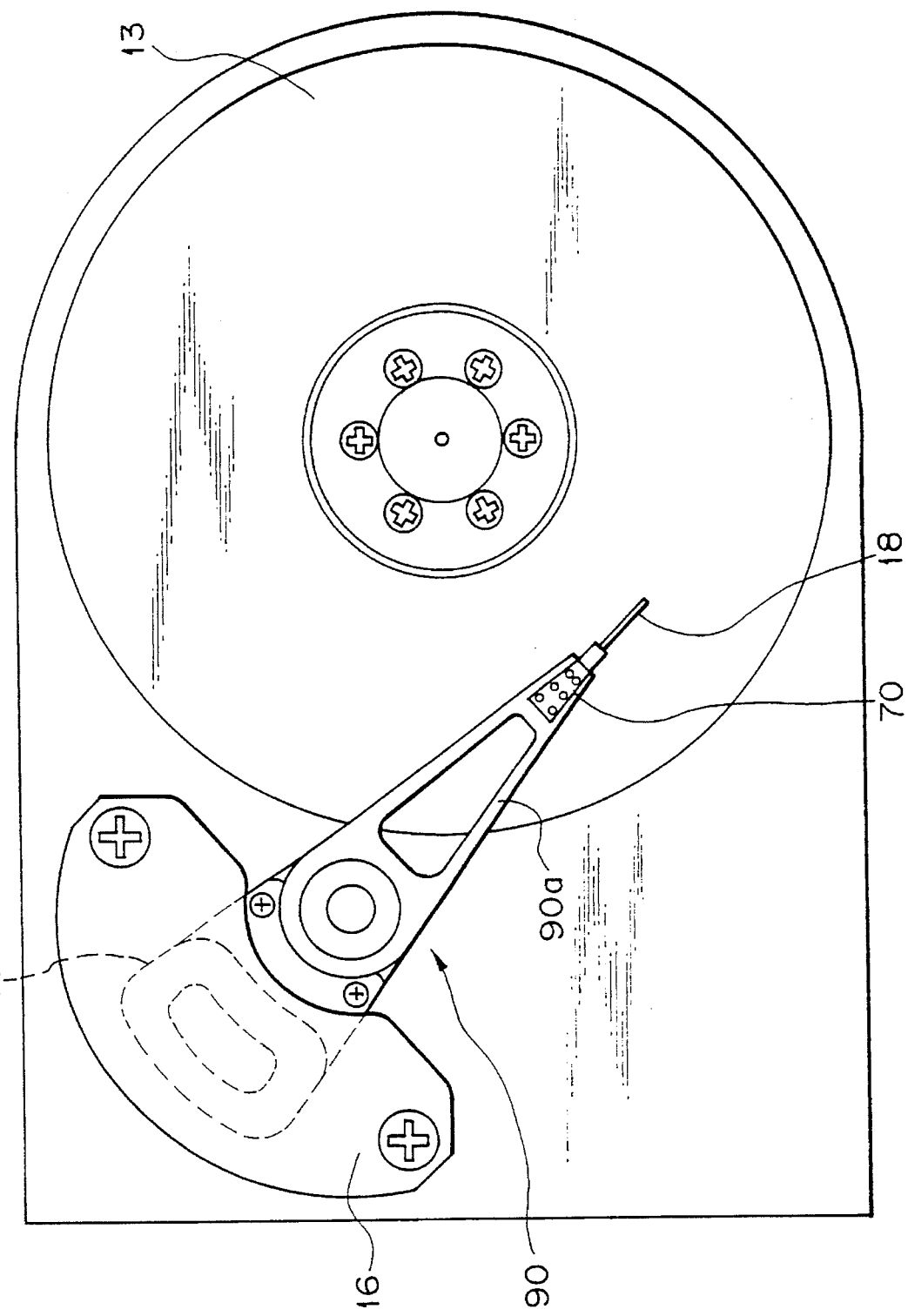
FIG. 32 is a top view of a ninth preferred embodiment of a disk drive made according to the present invention.

FIG. 32 is a view showing a ninth preferred embodiment of a disk drive according to the present invention. More specifically, FIG. 32 illustrates the whole structure of the magnetic disk drive.

As shown in FIG. 32, the construction of a disk drive in a ninth preferred embodiment is similar to that of a disk drive in a seventh preferred embodiment. However, the structure of the positioner 90 of the ninth embodiment is different from that of the seventh embodiment. To be more specific, in the ninth embodiment, the arms 17 of the positioners 14 and the spacers 19 (not shown in FIGS. 25 to 28) are laminated alternately and the arms 17 are composed of different members from the positioners 14. On the contrary, in the ninth embodiment, arm portions 90a functioning as the arm 17, described before, are integrated with positioners 14, respectively. In this case, the above arm portions 90a can be fabricated by means of cutting, similar to the arm portions 24a of the second embodiment.

The above ninth embodiment has the same advantage as the seventh embodiment, particularly in that the distance between adjoining disks can be reduced and the weight of the head supporting structure can be significantly reduced.

Figure 33:
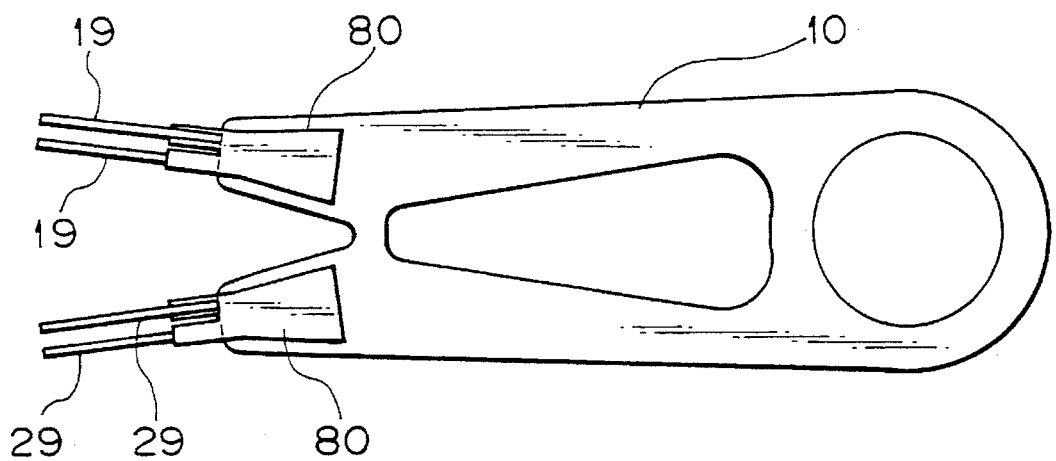
FIG. 33 is a top view of a portion of a magnetic disk drive made according to a tenth preferred embodiment of the present invention.
Figure 34:
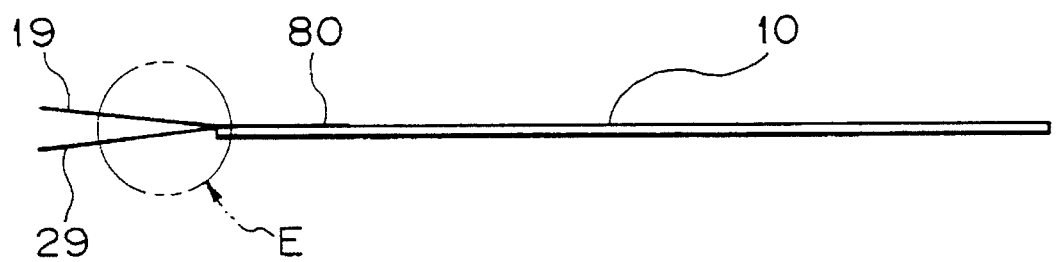
FIG. 34 is a front view of the apparatus of FIG. 33.
Figure 35:
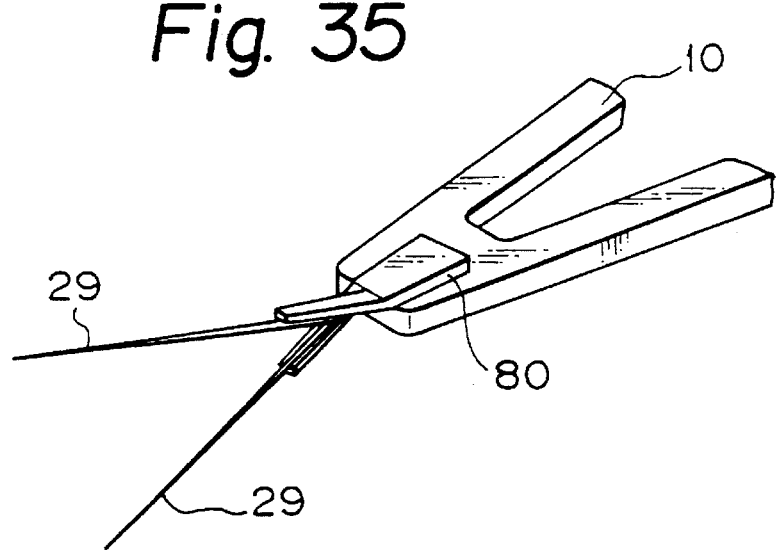
FIG. 35 is an enlarged perspective view of a portion E of FIG. 34.

FIGS. 33, 34 and 35 are views showing a tenth preferred embodiment of a disk drive according to the present invention. To be more specific, FIG. 33 is a top view showing the main part of the magnetic disk drive; FIG. 34 is a front view of FIG. 33 and FIG. 35 is an enlarged perspective view showing portion E of FIG. 34.

As shown in these figures, the construction of the head supporting structure in the tenth embodiment is similar to that of the head supporting structure in the third embodiment (see FIGS. 16 to 20), except that the integrated unitary magnetic head of the tenth embodiment is fixed on one end of the arm 17, via the head supporting means.

In such a construction, the access time of a whole disk drive is shortened and read/write operations can be performed at a higher speed, similar to the third embodiment.

Figure 36:
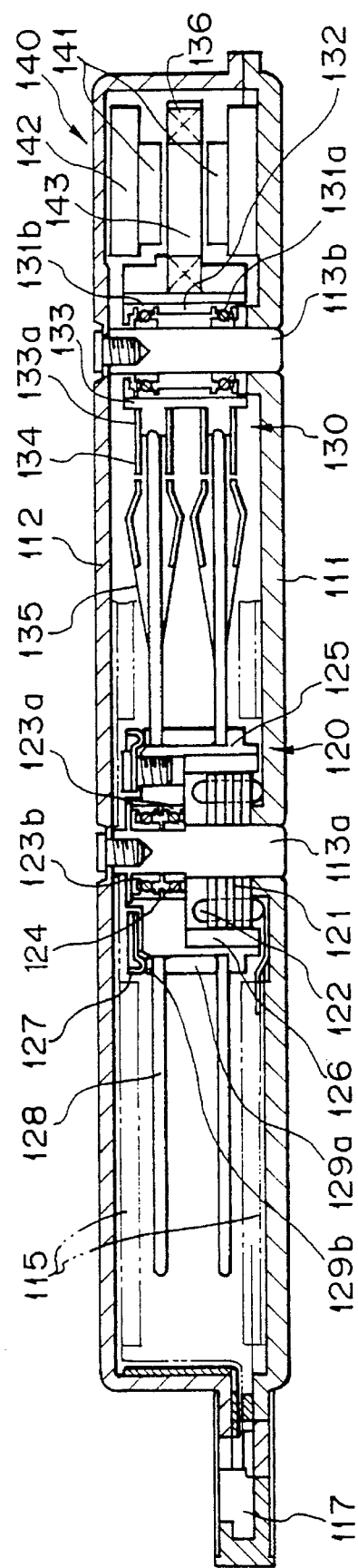
FIG. 36 is an internal view of a disk drive in which two disks are assembled in a disk enclosure according to the present invention.
Figure 37:
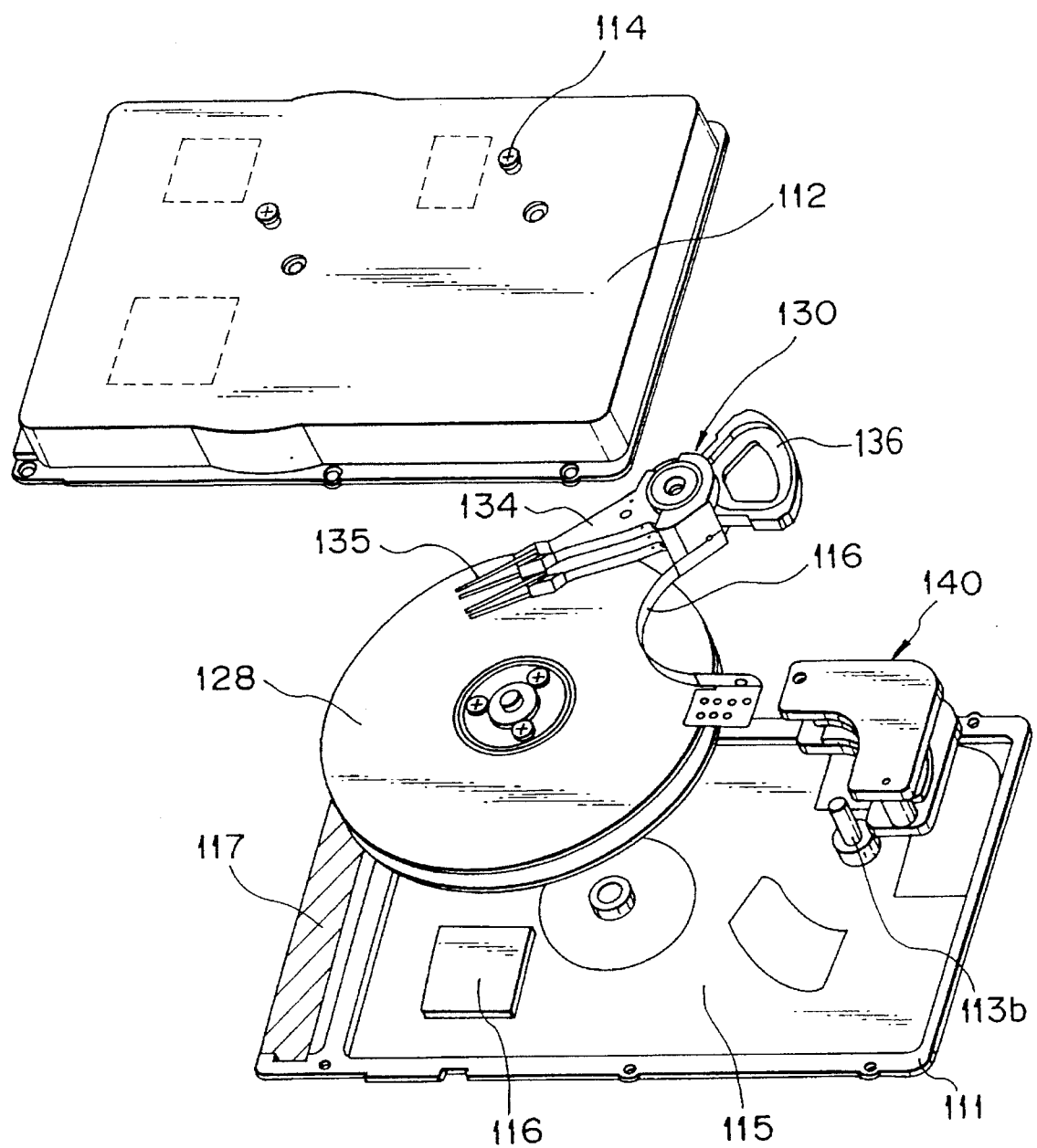
FIG. 37 is an exploded perspective view of a portion of the apparatus of FIG. 36.
Figure 38:
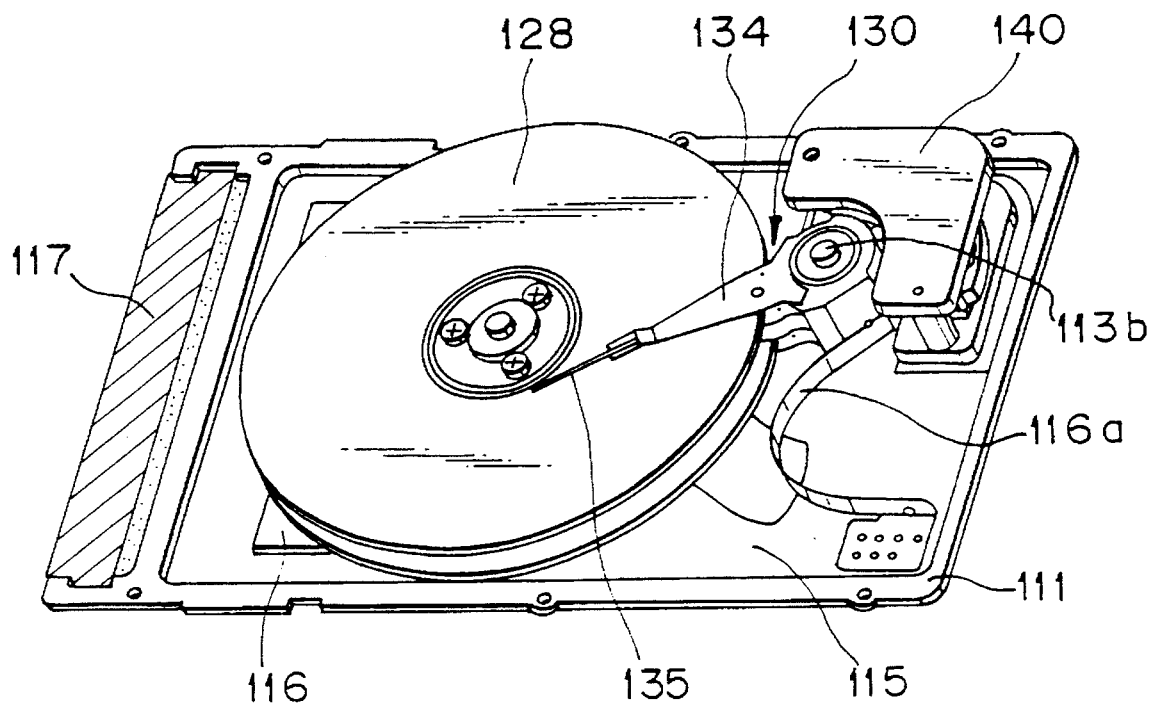
FIG. 38 is a perspective view of a portion of the apparatus of FIG. 36 partially assembled.

FIGS. 36, 37, 38 and 39 are views showing an example of a disk drive having the whole structure in which two disks are assembled in a disk enclosure according to the present invention. To be more specific, FIG. 36 is a front sectional view showing the whole structure; FIG. 37 is an exploded perspective view showing the main part of the structure; FIG. 38 is a partially assembled perspective view showing the main part of the structure and FIG. 39 is an enlarged perspective view showing the main part of the structure.

As shown in these figures, a magnetic disk drive includes the following components as a whole: two disks having a diameter of less than 1.8 inch, a disk driving means that forces the disks to rotate, four magnetic heads that perform read/write operations for the surfaces of recording media of the disks, arms that support the magnetic heads, positioners that support the arms rotatably, bearings that are arranged to allow the positioners to rotate, a positioner driving means that forces the positioners to rotate and make the magnetic heads move to a predetermined position on the surface of recording media of the disks, a base and cover that constitute a disk enclosure in combination with each other; the disk enclosure protecting at least the disks, the disk driving means, the magnetic head, the arms, the positioners, the bearings and the positioner driving means, and circuits for controlling at least the disk driving means, read/write operations of the magnetic heads and the positioner driving means.

In this case, the above circuits are composed of a flexible printed circuit board to be contained in the disk enclosure, and the height of the magnetic disk drive can be less than 10.5 mm. Further, the upper ends of shafts 113a, 113b are tightened to the cover 112 with screws.

On one shaft 113a, two magnetic recording media (disks) 128 are sustained and a spindle 120 is assembled. Further, on the other shaft 113b, actuators 130 including magnetic heads 135 and arms 134 are sustained. The above actuators 130 are adapted to move and maintain the magnetic heads 135 on the desired track of the disk 128.

115 denotes a flexible printed circuit board. This printed circuit board 115 is adhered and fixed to the inner surface of the base 111 and cover 112 with a releasable adhesive, etc. On the printed circuit board 115, electronic circuit components 116, which is necessary for controlling the operation of whole disk drive (for example, servo control unit, DCM control unit, read/write unit, interface control unit and the like), are assembled. Further, the printed circuit board 115 is connected to a connector that is supported by the base 111 and cover 112. Further, the connector 117 is connected to the receptacle of external electronic equipment (for example, a portable note-type computer) and therefore the magnetic disk drive shown in FIGS. 36 to 39 operates as a memory device of the above external electronic equipment.

Further in these figures, a spindle 120 has an in-spindle construction in which a hub of a DCM (direct current motor), i.e., the outer diameter of a rotor yoke, is approximately equal to the inner diameter of magnetic recording media 128. 121 denotes a stator having laminated structure silicon steel sheets. Stator 121 is fixed to the shaft 113a by means of adhesion. 122 denotes a coil of copper wire wound around the stator 121. Lead wires (not shown in FIGS. 36 to 39) extending from the coil 122 are connected to the respectively corresponding terminal on the printed circuit board 115 by means of soldering and therefore the current for driving the spindle 120 is supplied to the coil 122, via the lead wires.

Further, 123a denotes a rear bearing for magnetic recording media and 123b denotes a top bearing therefor. 124 denotes a spacer that maintains a constant gap between the rear bearing 123a and the top bearing 123b. The inner rings of the rear bearing 123a and the top bearing 123b are adhered and fixed to the shaft 113a. 125 denotes a hub of iron material. The inner peripheral portion of the hub 125 is adhered to the outer rings of the rear bearing 123a and the top bearing 123b.

Further, in the position confronting the stator 121 in the hub 125, a magnet 126 is adhered to the stator 121, concentrically. Consequently, a magnetic circuit is formed by the stator 121, a hub 125 and a magnet 126. By supplying an alternating current to the coil 122, a driving force is induced in the above magnetic circuit to make the hub 125 rotate. Two sheets of magnetic recording media 128 are held between a brim portion of the hub 125 and the spring ring 127, via a first space ring 129a and a second space ring 129b. By fastening the spring ring 127 to the hub 125 by compression by means of screws 114, the compression force is induced between the brim portion of the hub 125 and the spring ring 127, thereby firmly fixing two sheets of magnetic recording media 128 and the first and second space ring 129a, 129b.

Further, the construction of the actuator 130 including a magnetic head 135 and arm 134 will be described in detail, particularly in FIG. 40. 131a denotes a rear bearing for an actuator and 131b denotes a top bearing therefor. 132 denotes a spacer that maintains a constant gap between the rear bearing 131b and the top bearing 131b. The inner rings of the rear bearing 131a and the top bearing 131b are adhered and fixed to the shaft 113b. 133 denotes a block of aluminium material. The inner peripheral portion of the block 133 is adhered to the outer rings of the rear bearing 131a and the top bearing 131b.

Each brim portion 133a is arranged on one corresponding end of each block 133. On the respective surfaces of the brim portions 133a, four arms are adhered and fixed, respectively. The magnetic recording media 128 are adhered to one end of the arms 134, respectively. The magnetic head 135 confronts the respectively corresponding surfaces of the magnetic recording area. The coil 136 is fixed firmly on each side of the block 133 opposite each rim portion 133a by resin molding.

140 denotes a magnetic circuit that consists of a magnet 141 and a yoke of iron material 142. The above coil 136 is held in a magnetic air gap 143 of the magnetic circuit 140. The coil 136 is connected to the corresponding terminals on the printed circuit board 115, via an interconnecting means 116a, (for example, flexible printed circuit board) and the current is supplied to the coil 136. When the current flows through the coil 136 located in the magnetic air gap, the driving force is induced in the coil 136. Consequently, an actuator 130 moves rotationally around the shaft 113b. In read/write operations, a track position signal, indicating the present position of the magnetic head on the tracks, is issued from the magnetic head. In response to the above signal, the control circuit assembled on the printed circuit board controls the current that is supplied to the coil 136 and then moves and maintains the magnetic recording head 135 on the desired track of each magnetic recording medium 128.

In this case, an integrated unitary magnetic head shown in the previous embodiments is preferably used as a magnetic head, to realize smaller dimensions. However, a conventional magnetic head, such as a MIG magnetic head, can be used instead of the above unitary magnetic head.

In such a construction, the lower and upper ends of a disk enclosure has usually has unoccupied space, except for the vicinity of the spindle and actuator. Therefore, the various circuits can be assembled on the above space and it becomes possible for the space in the disk enclosure to be utilized effectively. More concretely, the utilization of the unoccupied space in the disk enclosure can be realized by arranging a flexible printed circuit board in a position other than spindle, magnetic head, etc. and assembling the circuits on the above printed circuit.

Conventionally, in 5 inch, 3.5 inch or 2.5 inch magnetic disk drives, a disk enclosure is made of aluminium to lighten said enclosure and the rigid printed circuit board is mounted on the bottom surface of a base of the disk enclosure.

Furthermore, in a disk drive using the disks having a diameter of less than 1.8 inch, the major part of various components of the disk drive is fabricated by press forming sheet metal. Therefore, an increase of the total weight can be minimized and the disk enclosure having an excellent shield effect and sufficient stiffness can be realized.

Finally, in a disk drive with two disks according to the present invention, a height of less than 10.5 mm and a storage capacity of greater than 120 MByte can be realized. In this case, the above disk drive can have the whole dimensions of approximately 3.37 inch×2.13 inch×0.41 inch, similar to the conventional disk drive. Further, the above disk drive can have the total weight of less than 3 ounce.

We claim:

1. A magnetic disk drive comprising:
   one or more disks that have a laminated arrangement with equally fixed spaces respectively and are rotatably mounted;
   a disk driving means that forces said disks to rotate;
   one or more positioners that are mounted in the direction of the tracks of said disks respectively, and each having a sloping surface inclined toward the corresponding surface of each of said disks;
   a positioner driving means that drives said positioners so that their respective ends can traverse said tracks; and,
   one or more reproducing/recording elements which are constituted by one or more unitary magnetic heads that perform read/write operations for said disks, and each of which consist of a body of flexible thin sheet, a head portion that is located on one tip portion of said body and that has the air gap for reproducing or recording formed in one surface of said body, and a mounting portion that is formed in the opposite tip portion of said body,
   wherein said mounting portion of each of said magnetic heads is fixed to said sloping surface of each of said positioners so that said magnetic heads have a predetermined inclination to the respectively corresponding surfaces of said disks.

2. A magnetic disk drive as set forth in claim 1, wherein a motor hub is provided as said disk driving means, and said disks are attached to said motor hub.

3. A magnetic disk drive as set forth in claim 1, wherein said sloping surface is a tapered surface, which is arranged on one end of each of said positioners and on the other surface thereof opposite one surface thereof confronting the corresponding surface of the recording medium of the disk, and is formed so that the thickness of each of said positioners in the direction of lamination of said disks can be decreased gradually toward the most leading position of said end of said each positioner.

4. A magnetic disk drive as set forth in claim 1, wherein said sloping surface is tapered surface that is arranged on one end of each of said positioners and on one surface confronting the corresponding surface of the recording medium of the disk, and is formed so that the thickness of each of said positioners in the direction of lamination of said disks can be increased gradually toward the most leading position of said end of said each positioners.

5. A magnetic disk drive as set forth in claim 1, wherein said sloping surface is a tapered surface arranged on an inner wall surface of a cutout groove, which is engraved on one end of said positioner and whose opening becomes narrow gradually in a sectional area as said opening goes from the inlet top the interior.

6. A magnetic disk drive as set forth in claim 1, wherein said sloping surface has an inclination angle of 5 to 10 degrees to the corresponding surface of said disk.

7. A magnetic disk drive as set forth in claim 1, wherein the distance between the surface of said disk and the surface of the corresponding positioner that confronts the surface of said disk in a direction of lamination of said disk is 0.3 to 0.6 mm, and wherein said positioner is flexible with the range of 0.3 to 0.6 mm in a direction of lamination of said disk, when said unitary magnetic head is fixed on said sloping surface.

8. A magnetic disk drive as set forth in claim 1, wherein, on the upper side and lower side of one end of each positioner, sloping surfaces are formed respectively, and wherein said mounting portions of a pair of said unitary magnetic heads are fixed on said upper and lower side of one end of said each positioner, respectively.

9. A magnetic disk drive as set forth in claim 1, when a positioner is located between adjoining disks having a laminated arrangement, said positioner includes:
   a base end portion fixed on one end of each of said positioners;
   a first sloping surface part that extends from said base end portion and inclines toward the surface of recording medium of one of the adjoining disks; and
   a second sloping surface part that extends from said base end portion and inclines toward the other adjoining disks.

10. A magnetic disk drive as set forth in claim 9, wherein said first sloping surface part and second sloping surface part are arranged parallel to each other, and a pair of said unitary magnetic heads are constructed so as to be fixed on said first and second sloping surface parts respectively.

11. A magnetic disk drive as set forth in claim 9, wherein said first and second unitary magnetic head units further comprise pairs of unitary magnetic head portions respectively, which are fixed on a pair of said head supporting means respectively, when one end of each of said positioners is located between adjoining disks having a laminated arrangement, wherein each of a pair of said head supporting means includes:

a base end portion fixed on one end of each of said positioners;

a first sloping surface part that extends from said base end portion and inclines toward the surface of a recording medium of one of the adjoining disks; and, a second sloping surface part that extends from said base and portion and inclines toward the other adjoining disks.

12. A magnetic disk drive as set forth in claim 8, wherein said pair of unitary magnetic heads are constructed to extend gradually in the distance between said pair of unitary magnetic heads in the direction of lamination of said disk and the mounting portion of each of said pair of unitary magnetic heads through the head portion thereof.

13. A magnetic disk drive as set forth in claim 8, wherein said pair of unitary magnetic heads are constructed such that one of said pair of unitary magnetic heads, fixed on said upper side of one end of said positioner, extends downward from the mounting portion of each of said pair of unitary magnetic heads, while the other of said pair of unitary magnetic heads, fixed on said lower side of one end of said positioner, extends upward from the mounting portion of each of said pair of unitary magnetic heads, such that said pair of unitary magnetic heads do not intersect each other.

14. A magnetic disk drive comprising:

one or more disks that have a laminated arrangement with equally fixed spaces respectively and are rotatably mounted;

a disk driving means that forces said disks to rotate;

one or more positioners that are mounted and movable in the direction of the tracks of said disks respectively, each of said one or more positioners having respective sloping surfaces inclined by a predetermined inclination to respective surfaces of said disks;

a positioner driving means that drives said positioners so that their respective ends can traverse said tracks; and, one or more reproducing/recording elements;

each of said one or more reproducing/recording elements having a mounting portion;

each of said reproducing/recording elements being fixed, at the mounting portion, on said respective sloping surfaces of said positioners and perform read/write operations for the surfaces of recording media of said disks respectively, each of said reproducing/recording elements having said predetermined inclination to the respectively corresponding surface of recording media of said disks as a result of being fixed to said respective sloping surfaces.

15. A magnetic disk drive as set forth in claim 1, wherein, each of said reproducing/recording elements is composed of a first unitary magnetic head unit and a second unitary magnetic head unit, each magnetic head unit consisting of a body made of a flexible thin sheet, a head portion located on one tip portion of said body and which has an air gap for reproducing or recording on one surface of said body, and a mounting portion formed on the opposite tip portion of said body, and wherein in each of said ends of said positioners are formed a first sloping surface part and a second sloping surface part, both of which have given inclinations to the respectively corresponding surface of recording media of said disks, and wherein the respective mounting portions of said first and second unitary magnetic head unit are constructed to be fixed on the respectively corresponding first and second sloping surface parts.

16. A magnetic disk drive as set forth in claim 15, wherein one end of each of said positioners is divided into two branches, and said first and second sloping surface portions are formed in a respective end position of said branches, on which said first and second unitary magnetic head units are fixed respectively, so that said first and second unitary magnetic head units can perform read/write operations for the internal peripheral part and the external peripheral part of the tracks of each disk, respectively.

17. A magnetic disk drive as set forth in claim 16, wherein said first and second unitary magnetic head units further comprise pairs of unitary magnetic portions, respectively, and wherein each of said pairs of unitary magnetic head portions are constructed such that one of said pair of unitary magnetic head portions, fixed on said upper side of one end of said positioner, extends downward from the mounting portion of each of said pair of unitary magnetic head portions, while the other of said pair of unitary magnetic head portions, fixed on said lower side of one end of said positioner, extends upward from the mounting portion of each of said pair of unitary magnetic head portion, and such that said pair of unitary magnetic head portions do not intersect each other.

18. A magnetic disk drive as set forth in claim 15, wherein said first and second unitary magnetic head units further comprise pairs of unitary magnetic head portions, respectively, and wherein each of said pairs of unitary magnetic head portions are constructed to extend gradually in the distance-between said pair of unitary magnetic head portions in the direction of lamination of said disk and the mounting portion of each of said pair of unitary magnetic head portions through the head portion thereof.

19. A magnetic disk drive as set forth in claim 1, wherein each of said reproducing/recording elements is a unitary magnetic head, consisting of a body made of a flexible thin sheet, a head portion located on one tip portion of said body that has an air gap for reproducing or recording on one surface of said body, and a bent-shaped mounting portion formed on the opposite tip portion of said body; said opposite tip portion being bent back against said one tip portion thereof, and wherein in each of said ends of said positioners is formed a parallel surface arranged approximately parallel to the surface of recording media of each disk, and wherein said bent-shaped mounting portion is constructed to be fixed on said parallel surface.

20. A magnetic disk drive as set forth in claim 1, wherein each of said positioners has one or more arms extending toward the corresponding surface of each of said disks and having the sloping surface, and wherein;

said mounting portion of each of said reproducing/recording elements is fixed to said sloping surface of each of said arms.

21. A magnetic disk drive as set forth in claim 20, wherein at least one arm portions functioning as said arms are integrated with each of said positioners as a portion thereof.

22. A magnetic disk drive as set forth in claim 20, wherein a flexible printed circuit board is arranged from one tip portion toward the opposite tip portion of one side area on one surface of said arm, and wherein lead wires extending from each of said unitary magnetic head is connected to one end of the corresponding flexible printed circuit board.

23. A magnetic disk drive as set forth in claim 20, wherein a flexible printed circuit board is arranged from one tip portion toward the opposite tip portion of one central area on one surface of said arm, and wherein lead wires extending from each of said unitary magnetic heads are connected to one end of the corresponding flexible printed circuit board.

24. A magnetic disk drive as set forth in claim 1, wherein each of said reproducing/recording elements is a unitary magnetic head consisting of a body made of a flexible thin sheet, a head portion that is located on one tip portion of said body and has an air gap for reproducing or recording on one surface of said body, and a mounting portion that is formed on the opposite tip portion of said body, and wherein a head supporting means is provided corresponding to each of said positioners; a base end portion of said head supporting means being attached on one end of each of said positioners and a sloping surface portion that inclines toward the surface of a recording medium of each of said disks on the tip end portion of each of said head supporting means, and wherein said mounting portion is constructed to be fixed on the corresponding sloping surface portion.

25. A magnetic disk drive as set forth in claim 24 when one end of said positioner is located between adjoining disks having laminated arrangement, wherein said head supporting means includes:
 a first head supporting member that is fixed on one end of each of said positioners and the sloping surface portion of which inclines toward the surface of a recording medium of one of the adjoining disks; and,
 a second head supporting member, the opposite tip portion of which is laminated on the opposite tip portion, and the sloping surface portion of which inclines toward the surface of a recording medium of the other adjoining disks.

26. A magnetic disk drive as set forth in claim 24, wherein a pair of unitary magnetic heads are constructed to be fixed on said sloping surface portions of said first and second head supporting members.

27. A magnetic disk drive as set forth in claim 24, wherein at least one arms are fixed in each of said positioners, and the base end portion of each of said head supporting means is mounted on one tip portion of said arm.

28. A magnetic disk drive as set forth in claim 25, wherein said first and second unitary magnetic head units further comprise pairs of unitary magnetic head portions respectively, which are fixed on a pair of said supporting means respectively, when one end of each of said positioners is located between adjoining disks having a laminated arrangement, wherein each of a pair of said head supporting means includes:
 a first head supporting member that is fixed on one end of each of said positioners and the sloping surface portion of inclines toward the surface of recording medium of one of the adjoining disks; and,
 a second head supporting member, the opposite tip portion of which is laminated on the opposite tip portion and the sloping surface portion of which inclines toward the surface of a recording medium of the other adjoining disks.

29. A magnetic disk drive as set forth in claim 1, wherein said each of reproducing/recording elements are composed of a first unitary magnetic head unit and a second unitary magnetic head unit consisting of a body made of a flexible thin sheet, a head portion that is located on one tip portion of said body and has an air gap for reproducing or recording on one surface of said body, and a mounting portion that is formed on the opposite tip portion of said body, and wherein a pair of head supporting means are provided for each of said positioners; the respective tip end portions of said pair of head supporting means being attached on one end of each of said positioners and a pair of sloping surface portions that incline toward the surface of recording medium of each of said disks being formed on the respective base tip portions of each of said pair of head supporting means, wherein said respective mounting of said first and second portions of said first and second unitary magnetic head units are constructed so as to be fixed on the respectively corresponding sloping surface portions of said pair of supporting means.

30. A magnetic disk drive as set forth in claim 25, wherein one end of each of said positioners is divided into two branches, and the base end portions of said pair of head supporting means are attached on respective end position of said branches and said first and second unitary magnetic head units are fixed on the tip portions of said pair of head supporting means respectively, so that said first and second unitary magnetic head units can perform read/write operations for the internal peripheral part and the external peripheral part of the tracks of each disk, respectively.

31. A magnetic disk drive as set forth in claim 30, wherein at least one arms portions functioning as said arms are integrated with each of said positioners as a portion thereof.

32. A magnetic disk drive as set forth in claim 20, wherein said arms are fabricated by press working sheet metal.

33. A magnetic disk drive comprising:
 one or more disks each having a recording medium;
 a disk driving means that forces said disks to rotate;
 one or more unitary magnetic heads, each having a mounting portion, which perform read/write operations for said disks;
 one or more arms each having a sloping surface inclined toward the corresponding surface of each of said disks, said unitary magnetic heads being fixed, at the mounting portion, on respective sloping surfaces of said arms so that said unitary magnetic heads have a predetermined inclination to respectively corresponding surfaces of said disks;
 one or more positioners that support said arms rotatably;
 one or more bearings that are arranged to allow said positioners to rotate;
 a positioner driving means that forces said positioners to rotate and make said unitary magnetic heads move to a predetermined portion on the surface of a recording medium of said disk;
 a base and cover forming a disk enclosure in combination with each other, said disk enclosure protecting said disks, said disk driving means, said unitary magnetic heads, said arms, said positioners, said bearings and said positioner driving means; and
 circuits for controlling said disk driving means, said positioner driving means, and read/write operations of said magnetic heads and said positioner driving means, wherein said circuits are composed of a flexible printed circuit board contained in said disk enclosure.

34. A magnetic disk drive as set forth in claim 33, comprising at least one first spindle rotatably supporting said positioners and a second spindle rotatably supporting said disks, at least one of said second spindle and said first spindle being fastened to said base by fastening members.

35. A magnetic disk drive comprising:

two disks having a diameter of less than 1.8 inches;

a disk driving means that forces said disks to rotate;

four magnetic heads, each having a mounting portion, which perform read/write operations for the corresponding surfaces of said disks respectively;

arms that support said magnetic heads, said arms having a sloping surface inclined toward the corresponding surface of each of said disks, said magnetic heads being filed, at the mounting portion, on respective sloping surfaces of said arms so that said unitary magnetic heads have a predetermined inclination to respectively corresponding surfaces of said disks;

positioners that support said arms rotatably;

bearings that are arranged to allow said positioners to rotate;

a positioner driving means that forces said positioners to rotate and makes each of said magnetic heads move to a predetermined position on the surface of each of said disks;

a base and cover forming a disk enclosure in combination with each other, said disk enclosure protecting said disks, said disk driving means, said magnetic heads, said arms, said positioners, said bearings and said positioner driving means, the height of said disk enclosure being less than 10.5 mm; and, circuits for controlling said disk driving means, read/write operations of said magnetic heads and said positioner driving means, wherein said circuits are composed of a flexible printed circuit board contained in said disk enclosure.

36. A magnetic disk drive as set forth in claim 35, wherein said magnetic heads record on said disks perpendicular to said disks, and wherein the storage capacity of said magnetic disk drive is greater than 120 MByte.

37. A magnetic disk drive as set forth in claim 36, further comprising a first spindle rotatably supporting said positioners and a second spindle rotatably supporting said disk, wherein at least one of said first and second spindle is engaged directly with said base.

38. A magnetic disk drive as set forth in claim 35, wherein said arms are fabricated by press working sheet metal.

39. A magnetic disk drive as set forth in claim 35, wherein a motor hub is provided as a disk driving means, and said disk is attached to said motor hub.

40. A magnetic disk drive as set forth in claim 35, wherein the disk drive has the whole dimensions of 3.37 inch×2.13 inch×0.41 inch.

41. A magnetic disk drive as set forth in claim 35, wherein it has the total weight of less than 3 ounces.

* * * * *

UNITED STATES PATENT AND TRADEMARK OFFICE
CERTIFICATE OF CORRECTION

PATENT NO. : 5,572,388
DATED : November 5, 1996
INVENTOR(S) : Yagi et al.

It is certified that error appears in the above-identified patent and that said Letters Patent is hereby corrected as shown below:

On the Title Page;

Under "[56] Referenced Cited" for "U.S. Patent Documents", insert

--4,924,337, 5/1990, Repphum et al.--.

Under "[56] Foreign Patent Documents", insert --2,600,452, 12/1987, France; 61-16080, 1/1986, Japan; 1-151001, 6/1989, Japan; 1-211282, 8/1989, Japan--.

Column 3, lines 58-59, delete "or more one" and insert --one or more--.

UNITED STATES PATENT AND TRADEMARK OFFICE
CERTIFICATE OF CORRECTION

PATENT NO. : 5,572,388
DATED : November 5, 1996
INVENTOR(S) : Yagi et al.

It is certified that error appears in the above-indentified patent and that said Letters Patent is hereby corrected as shown below:

Column 7, line 39, delete "15 forces" and insert --15, forces--.

Column 8, line 42, delete "183" and insert --18e--.

Column 9, line 65, delete "B-B" and insert --20-20--.

Column 15, line 27, delete "has", first occurrence.

Column 17, line 64, delete "claim 1," and insert --claim 14,--.

UNITED STATES PATENT AND TRADEMARK OFFICE
CERTIFICATE OF CORRECTION

PATENT NO. : 5,572,388
DATED : November 5, 1996
INVENTOR(S) : Yagi et al.

Page 3 of 4

It is certified that error appears in the above-indentified patent and that said Letters Patent is hereby corrected as shown below:

Column 18, line 41, delete "distance-between" and insert --distance between--.

Column 18, line 45, delete "claim 1," and insert --claim 14,--.

Column 18, line 58, delete "claim 1," and insert --claim 14,--.

Column 19, line 12, delete "claim 1," and insert --claim 14,--.

UNITED STATES PATENT AND TRADEMARK OFFICE
CERTIFICATE OF CORRECTION

PATENT NO. : 5,572,388  Page 4 of 4
DATED : November 5, 1996
INVENTOR(S) : Yagi et al.

It is certified that error appears in the above-indentified patent and that said Letters Patent is hereby corrected as shown below:

Column 19, line 66, delete "claim 1," and insert --claim 14,--.

Column 20, line 18, delete "claim 25," and insert --claim 29,--.

Column 21, line 13, delete "filed," and insert --fixed,--.

Signed and Sealed this

Ninth Day of December, 1997

Attest:

BRUCE LEHMAN

Attesting Officer     Commissioner of Patents and Trademarks